United States Patent
Yasuda

(10) Patent No.: US 8,672,466 B2
(45) Date of Patent: Mar. 18, 2014

(54) INK COMPOSITION, INK SET AND IMAGE FORMING METHOD

(75) Inventor: Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 291 days.

(21) Appl. No.: 13/219,725

(22) Filed: Aug. 29, 2011

(65) Prior Publication Data

US 2012/0069084 A1    Mar. 22, 2012

(30) Foreign Application Priority Data

Sep. 17, 2010 (JP) .................. 2010-210229

(51) Int. Cl.
*B41J 2/01* (2006.01)
*B41J 2/21* (2006.01)

(52) U.S. Cl.
CPC *B41J 2/01* (2013.01); *B41J 2/2107* (2013.01); *B41J 2/2114* (2013.01)
USPC ............................. 347/100; 347/95; 347/96

(58) Field of Classification Search
CPC ............ B41J 2/01; B41J 2/2107; C09D 11/30
USPC ........ 347/21, 28, 95–100, 102; 523/160, 161; 106/31.13, 31.27, 31.6
See application file for complete search history.

(56) References Cited

U.S. PATENT DOCUMENTS

| | | | | |
|---|---|---|---|---|
| 2009/0233062 A1* | 9/2009 | Nakamura et al. | .......... | 428/195.1 |
| 2010/0080913 A1* | 4/2010 | Irita | .............. | 427/258 |
| 2011/0020751 A1* | 1/2011 | Taguchi et al. | .............. | 430/302 |

FOREIGN PATENT DOCUMENTS

| | | |
|---|---|---|
| EP | 2100925 A | 9/2009 |
| JP | 2009-221281 A | 10/2009 |
| WO | 2008081996 A | 7/2008 |

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

An ink composition includes a polymerization initiator, water, and a modified polyallylamine or modified polyvinylamine having an ethylenically unsaturated double bond in a side chain thereof.

12 Claims, No Drawings

INK COMPOSITION, INK SET AND IMAGE FORMING METHOD

CROSS-REFERENCE TO RELATED APPLICATION

This application claims priority under 35 USC 119 from Japanese Patent Application No., 2010-210229 filed on Sep. 17, 2010, the disclosure of which is incorporated by reference herein.

BACKGROUND OF THE INVENTION

1. Field of Invention

The present invention relates to an ink composition, an ink set, and an image forming method.

2. Description of the Related Art

In recent years, as a result of ever-increasing demand for the protection of resources, the protection of the environment, the enhancement of operational stability, and the like, the conversion of coating materials and inks into aqueous products has steadily progressed. As a means for enhancing the fixing property of a printed image obtained by using an aqueous ink, for example, an ultraviolet ray curable aqueous ink is conventionally known.

An aqueous ink including a polymer compound having a polymerizable group in a side chain thereof as a water-soluble polymerizable compound that is can be applied to such ultraviolet ray curable aqueous inks, is known (see for example, Japanese Patent Application Laid-Open (JP-A) No. 2009-221281).

SUMMARY OF THE INVENTION

However, according to JP-A No. 2009-221281, a problem exists in that, when the printed recording media are stacked, a phenomenon (blocking) occurs in which the ink transfers to other stacked printed matter, or the like. Therefore, there is room for improvement.

The present invention has been made in view of the above circumstances and provides an ink composition, an ink set, and an image forming method.

According to a first aspect of the invention, there is provided an ink composition including a polymerization initiator, water, and a modified polyallylamine or modified polyvinylamine having an ethylenically unsaturated double bond in a side chain thereof.

According to a second aspect of the invention, there is provided an ink set including the ink composition according to the first aspect of the invention and a treatment liquid that is capable of forming an aggregate when contacting the ink composition.

According to a third aspect of the invention, there is provided n image forming method including:

applying the treatment liquid included in the ink set according to the second aspect of the invention onto a recording medium, and applying the ink composition included in the ink set onto the recording medium to form an image.

DETAILED DESCRIPTION OF THE INVENTION

Ink Composition

The ink composition of the present invention is configured to include a modified polyallylamine or modified polyvinylamine having an ethylenically unsaturated double bond in a side chain thereof, a polymerization initiator, and water. The ink composition of the present invention may further include, as necessary, a color material (preferably, a pigment), a water-soluble organic solvent, or other additives.

Modified Polyallylamine or Modified Polyvinylamine Having an Ethylenically Unsaturated Double Bond in a Side Chain Thereof The ink composition of the present invention contains a modified polyallylamine or modified polyvinylamine having an ethylenically unsaturated double bond in a side chain thereof.

The term "modified polyallylamine or modified polyvinylamine" as used in the present invention refers to a compound which is obtained by subjecting polyallylamine or polyvinylamine to chemical modification, or the like. More specifically, the term refers to a compound which is obtained by bonding a group having an ethylenically unsaturated double bond to a side chain of a polymer of polyallylamine or polyvinylamine, or the like.

The term "ethylenically unsaturated double bond" as used in the present invention means a carbon-carbon double bond. Examples thereof include $CH_2=CH-*$, $CH_2=C(CH_3)-*$, and $CH(CH_3)=CH-*$. From the viewpoint of the effects of the present invention, $CH_2=CH-*$ or $CH_2=C(CH_3)-*$ are preferable, and $CH_2=CH-*$ is most preferable.

It is preferable that the modified polyallylamine or modified polyvinylamine having an ethylenically unsaturated double bond in a side chain thereof has water solubility.

The term "water solubility" as used herein means that the modified polyallylamine or modified polyvinylamine having an ethylenically unsaturated double bond in a side chain thereof dissolves in distilled water at 25° C. in an amount of 2% by mass or more. The modified polyallylamine or the modified polyvinylamine in the invention dissolves in distilled water at 25° C. in an amount of preferably 5% by mass or more, more preferably 10% by mass or more, and still more preferably 20% by mass or more. Particularly preferably, the modified polyallylamine or the modified polyvinylamine in the invention uniformly dissolves in water at a given proportion.

The modified polyallylamine or the modified polyvinylamine preferably has a structure represented by the following Formula (A).

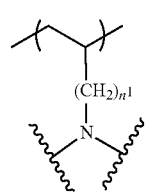

Formula (A)

In Formula (A), $n^1$ represents 0 or 1.

The modified polyallylamine or the modified polyvinylamine preferably has the ethylenically unsaturated double bond as a structure represented by the following Formula (I-A).

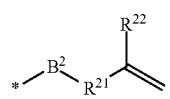

Formula (I-A)

In Formula (I-A), $B^2$ represents an alkylene group having from 1 to 8 carbon atoms or a carbonyl group. $R^{21}$ represents a single bond or an arylene group having from 6 to 10 carbon atoms. $R^{22}$ represents a hydrogen atom or a methyl group. * represents a bonding site.

In Formula (I-A), when $B^2$ represents an alkylene group having from 1 to 8 carbon atoms, the number of the carbon atoms is preferably from 1 to 6, and more preferably from 1 to 4.

Specific examples of the alkylene group having from 1 to 8 carbon atoms include a methylene group, an ethylene group, a propylene group, a butylene group, and a hexylene group. Among them, a methylene group is preferably used.

$B^2$ preferably represents a methylene group or a carbonyl group.

In Formula (I-A), when $R^{21}$ represents an arylene group having from 6 to 10 carbon atoms, specific examples thereof include a phenylene group and a naphthylene group. Among them, a phenylene group is preferably used. The arylene group may have a substituent or may have no substituent. When the arylene group has a substituent, examples of the substituent include an alkyl group such as a methyl group, an ethyl group, a propyl group, or a butyl group; an alkoxy group such as a methoxy group, an ethoxy group, a propoxy group, or a butoxy group; and a halogen atom such as —F, —Cl, or —Br. These substituents may have a straight chain structure or a branched structure.

$R^{21}$ preferably represents a single bond or a phenylene group.

$R^{22}$ represents a hydrogen atom or a methyl group, and preferably a hydrogen atom.

In Formula (I-A), it is preferable that $B^2$ represents a carbonyl group, $R^{21}$ represents a single bond, and $R^{22}$ represents a hydrogen atom. Further, an embodiment in which, in Formula (I-A), $B^2$ represents an alkylene group having from 1 to 4 carbon atoms, $R^{21}$ represents an arylene group having from 6 to 10 carbon atoms, and $R^{22}$ represents a hydrogen atom is also preferable.

Formula (I-A) above is preferably the following Formula (I-A-1) or (I-A-2).

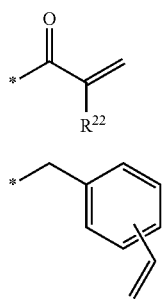

Formula (I-A-1)

Formula (I-A-2)

In Formula (I-A-1), $R^{22}$ has the same definition (including the preferable ranges) as $R^{22}$ in Formula (I-A). In Formula (I-A-1) and Formula (I-A-2), * represents a bonding site.

The modified polyallylamine or modified polyvinylamine having an ethylenically unsaturated double bond in a side chain thereof is preferably a compound having a structure represented by the following Formula (I). One kind or two or more kinds of the structure represented by the following Formula (I) may be included in the compound.

Formula (I)

In Formula (I), A' represents Formula (I-A) above. $X^1$ represents a hydrogen atom or the following Formula (I-X). $n^1$ represents 0 or 1.

Formula (I-X)

In Formula (I-X), $Y^{31}$ represents an alkylene group having from 1 to 8 carbon atoms or an arylene group having from 6 to 10 carbon atoms. $Z^{31}$ represents a hydrogen atom or —COOM$^{31}$. $M^{31}$ represents an alkaline metal atom. * represents a bonding site.

$A^1$ in Formula (I) represents Formula (I-A) above, and the preferable ranges are also the same.

In Formula (I-X), when $Y^{31}$ represents an alkylene group having from 1 to 8 carbon atoms, the number of the carbon atoms is preferably from 1 to 6, and more preferably from 1 to 4.

When $Y^{31}$ represents an alkylene group having from 1 to 8 carbon atoms, specific examples thereof include a methylene group, an ethylene group, a propylene group, a butylene group, and a hexylene group. Among them, a methylene group or an ethylene group is preferably used.

In Formula (I-X), when $Y^{31}$ represents an arylene group having from 6 to 10 carbon atoms, specific examples thereof include a phenylene group and a naphthylene group. Among them, a phenylene group is preferably used. The arylene group may have a substituent or may have no substituent. When the arylene group has a substituent, examples of the substituent include an alkyl group such as a methyl group, an ethyl group, a propyl group, or a butyl group; an alkoxy group such as a methoxy group, an ethoxy group, a propoxy group, or a butoxy group; and a halogen atom such as —F, —Cl, or —Br. These substituents may have a straight chain structure or a branched structure.

$Y^{31}$ preferably represents an alkylene group having 1 or 2 carbon atoms, or a phenylene group.

In Formula (I-X), $Z^{31}$ represents a hydrogen atom or —COOM$^{31}$. $M^{31}$ represents an alkaline metal atom.

When $Z^{31}$ represents —COOM$^{31}$ ($M^{31}$ represents an alkaline metal atom), specific examples of $M^{31}$ include Li, Na, and K. $M^{31}$ preferably represents Na, K, or the like.

$Z^{31}$ preferably represents a hydrogen atom, —COONa, or —COOK.

$X^1$ in Formula (I) above preferably represents a hydrogen atom or an embodiment in which, in Formula (I-X) above, $Y^{31}$ represents an alkylene group having 1 or 2 carbon atoms, or a phenylene group, and $Z^{31}$ represents a hydrogen atom, —COONa, or —COOK.

Specific examples of the structure represented by Formula (I) are shown below. However, the present invention is not limited to these specific examples.

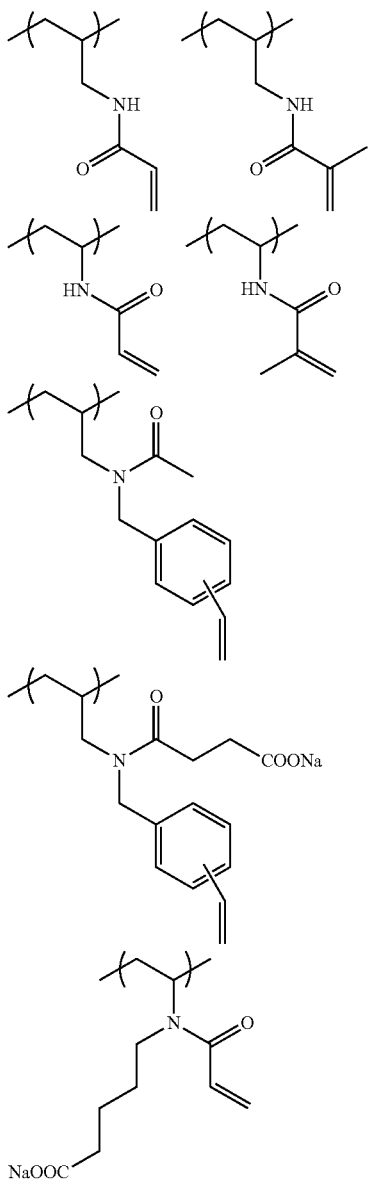

The compound having the structure represented by Formula (I), which is preferably used in the present invention, may be a homopolymer or a copolymer containing the structure represented by Formula (I) and other structure as repeating units, and is preferably a copolymer. When the compound having the structure represented by Formula (I) is a copolymer, the content of the structure represented by Formula (I) in the copolymer is preferably from 1 mol % to 80 mol %, more preferably from 5 mol % to 75 mol %, and most preferably from 7 mol % to 70 mol %. When the content of the structure represented by Formula (I) in the copolymer is within this range, the water solubility of the compound having the structure represented by Formula (I) can be further enhanced, which is preferable.

It is preferable that the compound having the structure represented by Formula (I) above, which is preferably used in the present invention, further has a structure represented by the following Formula (I'). One kind or two or more kinds of the structure represented by the following Formula (I') may be included in the compound having the structure represented by Formula (I) above.

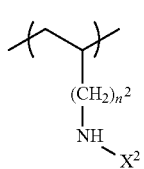

Formula (I')

In Formula (I'), $X^2$ represents Formula (I'-X). $n^2$ represents 0 or 1.

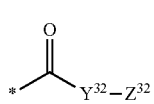

Formula (I'-X)

In Formula (I'-X), $Y^{32}$ represents an alkylene group having from 1 to 8 carbon atoms or an arylene group having from 6 to 10 carbon atoms. $Z^{32}$ represents a hydrogen atom or —COOM$^{32}$. M$^{32}$ represents an alkaline metal atom. * represents a bonding site.

In Formula (I'-X), when $Y^{32}$ represents an alkylene group having from 1 to 8 carbon atoms, the number of the carbon atoms is preferably from 1 to 6, and more preferably from 1 to 4.

When $Y^{32}$ represents an alkylene group having from 1 to 8 carbon atoms, specific examples thereof include a methylene group, an ethylene group, a propylene group, a butylene group, and a hexylene group. Among them, a methylene group or an ethylene group is preferably used.

In Formula (I'-X), when $Y^{32}$ represents an arylene group having from 6 to 10 carbon atoms, specific examples thereof include a phenylene group and a naphthylene group. Among them, a phenylene group is preferably used. The arylene group may have a substituent or may have no substituent. When the arylene group has a substituent, examples of the substituent include an alkyl group such as a methyl group, an ethyl group, a propyl group, or a butyl group; an alkoxy group such as a methoxy group, an ethoxy group, a propoxy group, or a butoxy group; and a halogen atom such as —F, —Cl, or —Br. These substituents may have a straight chain structure or a branched structure.

$Y^{32}$ preferably represents an alkylene group having 1 or 2 carbon atoms, or a phenylene group.

In Formula (I'-X), $Z^{32}$ represents a hydrogen atom or —COOM$^{32}$. M$^{32}$ represents an alkaline metal atom.

When $Z^{32}$ represents —COOM$^{32}$ (M$^{32}$ represents an alkaline metal atom), specific examples of M$^{32}$ include Li, Na, and K. M$^{32}$ preferably represents Na, K, or the like.

$Z^{32}$ preferably represents a hydrogen atom, —COONa, or —COOK.

Specific examples of the compound having a structure represented by Formula (I') above are shown below. However, the present invention is not limited to these specific examples.

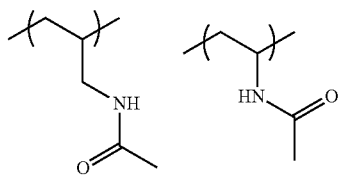

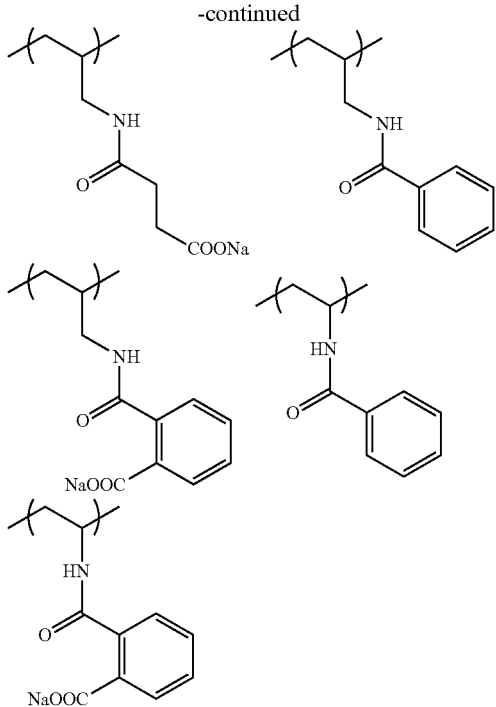

One kind or two or more kinds of a structure represented by the following Formula (III) may also be included in the compound having the structure represented by Formula (I), which is preferably used in the present invention.

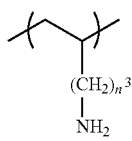

Formula (III)

In Formula (III), $n^3$ represents 0 or 1.

The modified polyallylamine or modified polyvinylamine having an ethylenically unsaturated double bond in a side chain thereof according to the present invention preferably has a structure represented by the following Formula (I-1).

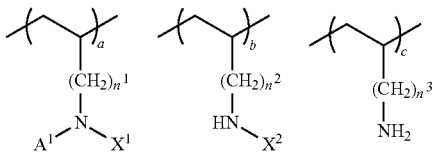

Formula (I-1)

In Formula (I-1), a represents a number from 1 to 80, b represents a number from 10 to 95, and c represents a number from 0 to 30. However, a+b+c=100.

$X^1$, $A^1$, and $n^1$ have the same definitions (including the preferable ranges) as $X^1$, $A^1$, and $n^1$ in Formula (I) above, respectively. $X^2$ and $n^2$ have the same definitions (including the preferable ranges) as $X^2$ and $n^2$ in Formula (I') above, respectively. $n^3$ has the same definition (including the preferable ranges) as $n^3$ in Formula (III) above.

In Formula (I-1), a, b, and c each represent the mole ratio of the repeating unit.

In Formula (I-1), a represents a number of from 1 to 80, preferably represents a number of from 5 to 75, and more preferably a number of from 7 to 70.

In Formula (I-1), b represents a number of from 10 to 95, preferably represents a number of from 20 to 90, and more preferably a number of from 25 to 87.

In Formula (I-1), c represents a number of from 0 to 30, preferably represents a number of from 0 to 20, and more preferably a number of from 0 to 15.

In Formula (I-1), it is preferable that a represents a number of from 5 to 75, b represents a number of from 20 to 90, and c represents a number of from 0 to 20. It is more preferable that a represents a number of from 7 to 70, b represents a number of from 25 to 87, and c represents a number of from 0 to 15.

Specific examples of the modified polyallylamine or modified polyvinylamine having an ethylenically unsaturated double bond in a side chain thereof, which may be used in the present invention, are shown below. However, the present invention is not limited to these specific examples. Note that, in the following description, "Mw" means the weight average molecular weight of the polymerizable compound as measured by GPC (gel permeation chromatography).

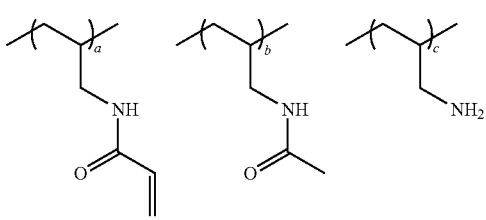

| a | b | c | Mw | Modified Polyallylamine or Modified Polyvinylamine Compound No. |
|---|---|---|---|---|
| 10 | 85 | 5 | 3,000 | 1 |
| 22 | 74 | 4 | 3,000 | 2 |
| 33 | 64 | 3 | 3,000 | 3 |
| 34 | 63 | 3 | 5,000 | 4 |
| 34 | 63 | 3 | 14,000 | 5 |

-continued
| | | | | | | Modified Polyallylamine or Modified Polyvinylamine |
|---|---|---|---|---|---|---|
| | | | a | b | c | Mw | Compound No. |
| 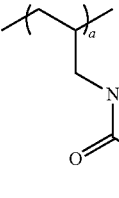 | 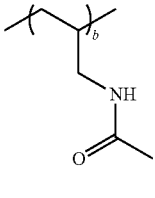 | 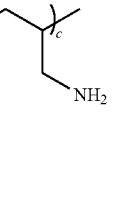 | 33<br>34 | 64<br>63 | 3<br>3 | 3,000<br>14,000 | 6<br>7 |
| 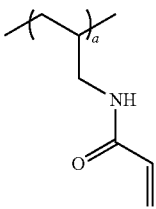 | 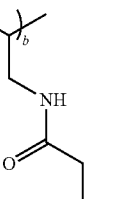 | 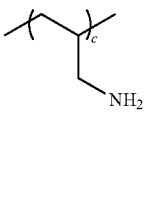 | 11<br>35<br>33 | 84<br>60<br>61 | 5<br>5<br>6 | 5,000<br>8,000<br>21,000 | 8<br>9<br>10 |
| 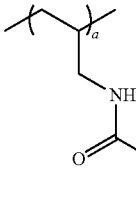 | 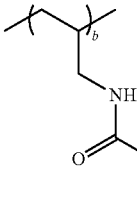 | 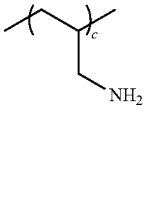 | 33 | 62 | 5 | 18,000 | 11 |
| 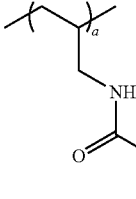 | 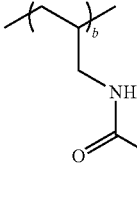 | 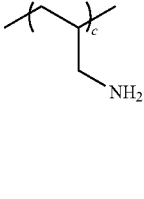 | 23<br>32 | 71<br>60 | 6<br>8 | 4,000<br>19,000 | 12<br>13 |
| 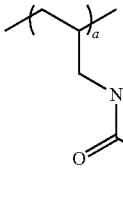 | 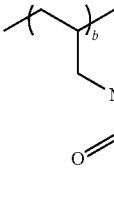 | 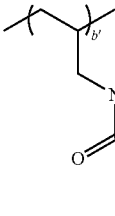 | 13 | (b) 62<br>(b') 15 | 10 | 8,000 | 14 |
| 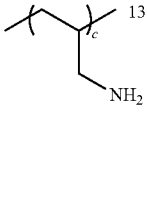 | 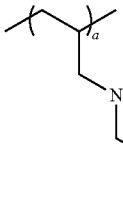 | 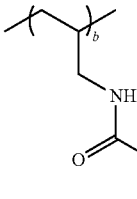 | 23<br>63<br>52<br>52 | 72<br>32<br>43<br>43 | 5<br>5<br>5<br>5 | 4,000<br>5,000<br>8,000<br>22,000 | 15<br>16<br>17<br>18 |
Note: 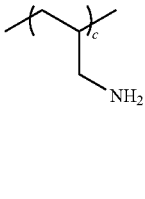 also appears but was not separately placed above.

-continued

| | | | a | b | c | Mw | Modified Polyallylamine or Modified Polyvinylamine Compound No. |
|---|---|---|---|---|---|---|---|
| (structure with N-benzyl/vinyl, succinate CO₂Na) | (structure with NH-succinate CO₂Na) | (structure with NH₂) | 43 | 50 | 7 | 6,000 | 19 |
| (acrylamide unit) | (acetamide unit) | (NH₂ unit) | 22 | 71 | 7 | 10,000 | 20 |
| | | | 33 | 62 | 5 | 10,000 | 21 |
| (methacrylamide unit) | (acetamide unit) | (NH₂ unit) | 33 | 62 | 5 | 11,000 | 22 |
| (acrylamide unit) | (succinamide CO₂Na unit) | (NH₂ unit) | 31 | 62 | 7 | 16,000 | 23 |
| (acrylamide unit) | (phthalamide CO₂Na unit) | (NH₂ unit) | 31 | 62 | 7 | 19,000 | 24 |
| (acrylamide unit) | (benzamide unit) | (NH₂ unit) | 35 | 60 | 5 | 15,000 | 25 |

-continued

| | a | b | c | Mw | Modified Polyallylamine or Modified Polyvinylamine Compound No. |
|---|---|---|---|---|---|
| (structure) | 52 | 40 | 8 | 17,000 | 26 |
| (structure) | 53 | 41 | 6 | 26,000 | 27 |

The weight average molecular weight of the modified polyallylamine or modified polyvinylamine having an ethylenically unsaturated double bond in a side chain thereof according to the present invention is preferably from 500 to 70,000, and more preferably from 1,000 to 50,000.

Note that, the weight average molecular weight can be calculated in terms of the standard reference material by gel permeation chromatography (GPC).

In the ink composition of the present invention, the content of the modified polyallylamine or modified polyvinylamine having an ethylenically unsaturated double bond in a side chain thereof is preferably from 0.1% by mass to 50% by mass, more preferably from 0.5% by mass to 40% by mass, and most preferably from 1% by mass to 30% by mass.

In the present invention, the present inventors have succeeded in improving the curing sensitivity of the ink composition and improving the blocking resistance of the formed image, by using a modified polyallylamine or modified polyvinylamine having an ethylenically unsaturated double bond in a side chain thereof and a polymerization initiator. The mechanism for obtaining the effects of the present invention is not clear, but the present inventors assume as follows. The modified polyallylamine or modified polyvinylamine having an ethylenically unsaturated double bond in a side chain thereof, which is used in the present invention, is less likely to be decomposed by an acid, an alkali, or the like, and therefore, curing of the ink composition proceeds favorably. As a result, it is thought that bleeding of low molecular weight components or the like in the ink composition onto the surface of the image or the vicinity thereof can be suppressed, and blocking resistance and the like can be improved. However, it should be noted that the above mechanism is simply conjecture inferred by the present inventors, and the invention is not limited thereto.

Additional Polymerizable Compound

The ink composition of the present invention may further contain an additional polymerizable compound other than the modified polyallylamine or modified polyvinylamine having an ethylenically unsaturated double bond in a side chain thereof, to the extent that the effects of the present invention are not impaired.

The additional polymerizable compound is not limited as far as the compound is a polymerizable compound other than the modified polyallylamine or modified polyvinylamine having an ethylenically unsaturated double bond in a side chain thereof. The additional polymerizable compound is preferably a radically polymerizable compound, more preferably a polymerizable compound having an ethylenically unsaturated bond, and most preferably a compound having at least one ethylenically unsaturated bond in a molecule thereof. The additional polymerizable compound may have a chemical form of, for example, a monomer, an oligomer, a polymer, or the like.

One kind of the additional polymerizable compound may be used alone, or two or more types of them may be used in combination at given ratio for the purpose of improving the intended properties.

Examples of the polymerizable compound having an ethylenically unsaturated bond include radically polymerizable compounds such as unsaturated carboxylic acids (for example, acrylic acid, methacrylic acid, itaconic acid, crotonic acid, isocrotonic acid, and maleic acid, salts thereof, and derivatives thereof); anhydrides having an ethylenically unsaturated group; acrylonitrile; styrene; and various unsaturated polyesters, unsaturated polyethers, unsaturated polyamides, and unsaturated urethanes.

Specific examples thereof include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloyloxy polyethoxy phenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N,N-dimethylamino acrylamide, N,N-dimethylaminoethyl acrylamide, N,N-dimethylaminopropyl acrylamide, and quaternized compounds thereof, N-methylolacrylamide, hydroxyethyl acrylamide, hydroxypropyl acrylamide, 4-acryloylmorpholine, N-[1,1-dimethyl-2-(sodiooxysulfonyl)ethyl]acrylamide, diacetone acrylamide, and epoxy acrylate; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, 2,2-bis(4-methacryloyloxy polyethoxy phenyl)propane, N,N-dimethylamino methacrylamide, N,N-dimethylaminoethyl methacrylamide, and N,N-dimethylaminopropyl methacrylamide; and derivatives of allyl compounds such as allyl glycidyl ether, diallyl phthalate, and triallyl trimellitate.

Among them, water-soluble polymerizable compounds having an ethylenically unsaturated bond are preferable from the viewpoint of jetting stability of the ink composition. Herein, the "water solubility" has the same definition as in the above modified polyallylamine or modified polyvinylamine having an ethylenically unsaturated double bond in a side chain thereof.

As an example of the water-soluble polymerizable compound having an ethylenically unsaturated bond, at least one selected from the group consisting of acrylic acid, methacrylic acid, ester derivatives thereof, amide derivatives thereof, and salts thereof is preferable. Examples thereof include monoesters of acrylic acid and monoesters of methacrylic acid (hereinafter, may be referred to as "mono(meth)acrylates"), esters of acrylic acid and a polyol compound, and esters of methacrylic acid and a polyol compound (hereinafter, may be referred to as "polyfunctional (meth)acrylate monomers" or "polyfunctional (meth)acrylate oligomers"), acrylamide, methacrylamide, and derivatives thereof.

From the viewpoint of imparting water solubility, the water-soluble polymerizable compound having an ethylenically unsaturated bond, which is used in the present invention, can have at least one of a poly(ethyleneoxy) chain, a poly(propyleneoxy) chain, an ionic group (for example, a carboxyl group, a sulfo group, or the like) or a hydroxyl group.

When the water-soluble polymerizable compound having an ethylenically unsaturated bond has a poly(ethyleneoxy) chain or a poly(propyleneoxy) chain, the number of the ethyleneoxy units or the propyleneoxy units is preferably in a range of from 1 to 10, and more preferably in a range of from 1 to 5.

The water-soluble polymerizable compound having an ethylenically unsaturated bond, which can be used in the present invention, is preferably a (meth)acrylamide compound or a (meth)acrylate compound, more preferably a (meth)acrylamide compound or (meth)acrylate compound having a hydroxyl group, and most preferably a (meth)acrylamide compound having a hydroxyl group. Here, the term "(meth)acrylamide" means acrylamide and methacrylamide, and the term "(meth)acrylate" means acrylate and methacrylate.

The content of the additional polymerizable compound in the ink composition of the invention is preferably in the range of from 0.1 to 50% by mass, more preferably in the range of from 0.5 to 40% by mass, and still more preferably in the range of from 1.0 to 30% by mass, in terms of the solid content.

In the ink composition of the present invention, the total content of the modified polyallylamine or modified polyvinylamine having an ethylenically unsaturated double bond in a side chain thereof and the additional polymerizable compound is preferably from 1% by mass to 40% by mass, more preferably from 2% by mass to 35% by mass, and most preferably from 3% by mass to 30% by mass.

Polymerization Initiator

The ink composition of the invention contains at least one polymerization initiator. As the polymerization initiator, a known polymerization initiator may be used without particular limitation. As the polymerization initiator in the invention, a photopolymerization initiator is preferably used.

Examples of a preferable photopolymerization initiator that may be used in the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (I) compounds having a carbon halogen bond, and (m) alkylamine compounds.

Examples of the photopolymerization initiator include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoine, benzoin methyl ether, benzoin ethyl ether, benzoin isopropyl ether, benzoin n-propyl ether, benzoin isobutyl ether, benzoin n-butyl ether, benzil dimethyl ketal, tetramethylthiuram monosulfide, thioxanthone, 2-chlorothioxanthone, 2-methylthioxanthone, 1-hydroxycyclohexyl phenyl ketone, 1-[4-(2-hydroxyethoxy)-phenyl]-2-hydroxy-2-methyl-1-propane-1-one, 2-hydroxy-2-methyl-1-phenyl-1-one, 1-(4-isopropylphenyl)-2-hydroxy-2-methylpropane-1-one, and methyl benzoyl formate. Further examples include an aromatic diazonium salt, an aromatic halonium salt, an aromatic sulfonium salt, and a metallocene compound, such as triphenylsulfonium hexafluorophosphate or diphenyliodonium hexafluoroantimonate.

Specific examples of the polymerization initiator include the polymerization initiators disclosed on pages 65 to 148 of "Shigaisen Koka Shisutemu (Ultraviolet Ray-Curing System)" written by Kiyoshi KATO (published by Sogo Gijutsu Center K.K. (1988)), the polymerization initiators disclosed in Japanese Patent No. 3576862, and the polymerization initiators disclosed in JP-A No. 2005-307198.

As the polymerization initiator in the invention, a polymerization initiator in which a water-insoluble initiator has been dispersed in water and a water-soluble initiator may be used, and a water-soluble polymerization initiator is preferable. The "water solubility" in the polymerization initiator means that the polymerization initiator dissolves in distilled water at 25° C. in an amount of 0.5% by mass or more. The water-soluble polymerization initiator dissolves in distilled water at 25° C. in an amount of preferably 1% by mass or more and more preferably 3% by mass or more.

In the present invention, one kind of the polymerization initiators may be used alone, or two or more kinds of them may be used in combination.

The content of the polymerization initiator in the ink composition of the invention is preferably in a range of from 0.1% by mass to 30% by mass in terms of the solid content. The content is more preferably in a range of from 0.5% by mass to 20% by mass, and still more preferably in a range of from 1% by mass to 15% by mass.

Further, the content of the polymerization initiator in the ink composition of the invention is preferably in a range of from 0.01 parts by mass to 35 parts by mass with respect to 100 parts by mass of the total mass of the modified polyallylamine or modified polyvinylamine having an ethylenically unsaturated double bond in a side chain thereof and the additional polymerizable compound that is contained as needs arise. The content is more preferably in a range of from 0.1 parts by mass to 30 parts by mass, and still more preferably in a range of from 0.5 parts by mass to 30 parts by mass.

Here, the term "content of the polymerization initiator" means the total content of the polymerization initiator(s) in the ink composition.

Water

The ink composition of the present invention contains water, and may further include, as necessary, at least one of the water-soluble organic solvents described below.

The water used in the invention is preferably water that does not contain ionic impurities, for example, ion exchange water, distilled water, or the like. Further, the content ratio of water in the ink composition may be selected as appropriate depending on the purpose, but usually, the content ratio of water is preferably from 10% by mass to 95% by mass, more preferably from 30% by mass to 90% by mass, and most preferably from 40% by mass to 85% by mass.

Color Material

The ink composition in the invention preferably contains at least one color material. As the color material in the invention, known dyes, pigments, or the like may be used without particular limitation. In particular, a color material that is almost insoluble or difficult to dissolve in water is preferable, from the viewpoint of ink coloring properties. Specific examples include various pigments, disperse dyes, oil-soluble dyes, and coloring matter forming a J-aggregate. From the viewpoint of lightfastness, pigments are more preferable.

The pigment in the invention is not particularly limited in the type, and known organic and inorganic pigments may be used.

Examples of the organic pigment include an azo pigment, a polycyclic pigment, a dye chelate, a nitro pigment, a nitroso pigment, and an aniline black. Among the above, an azo pigment, a polycyclic pigment, and the like are more preferable. Examples of the azo pigment include an azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye type chelate and an acid dye type chelate.

Examples of the inorganic pigment include titanium oxide, iron oxide, calcium carbonate, barium sulfate, aluminum hydroxide, barium yellow, cadmium red, chrome yellow, and carbon black. Among the above, carbon black is particularly preferable. Examples of the carbon black include those manufactured by a known method such as a contact method, a furnace method, or a thermal method.

Specific examples of the pigment that may be used in the invention include the pigments disclosed in Paragraphs [0142] to [0145] of JP-A No. 2007-100071.

Examples of pigments for orange or yellow include C. I. Pigment Orange 31, C. I. pigment orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C. I. Pigment Yellow 185.

Examples of pigments for magenta or red include C. I. Pigment Red 2, C. I. Pigment Red 3, C. I. Pigment Red 5, C.I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, and C. I. Pigment Red 222.

Examples of pigments for green or cyan include C. I. Pigment Blue 15, C. I. Pigment Blue 15:2, C. I. Pigment Blue 15:3, C. I. Pigment Blue 16, C. I. Pigment Blue 60, C. I. Pigment Green 7, and siloxane cross-linked aluminum phthalocyanine disclosed in U.S. Pat. No. 4,311,775.

Examples of pigments for black include C.I. Pigment Black 1, C. I. Pigment Black 6 and C. I. Pigment Black 7.

When a dye is used as the color material in the invention, a dye supported on a water-insoluble carrier may be used. As the dye, a known'dye may be used without particular limitation and the dyes disclosed in, for example, JP-A Nos. 2001-115066, 2001-335714, and 2002-249677 may be suitably used also in the invention. As the carrier, an inorganic material, an organic material, and a composite material thereof may be used without particular limitation insofar as it is insoluble or difficult to dissolve in water. Specifically, the carriers disclosed in, for example, JP-A Nos. 2001-181549 and 2007-169418 may be preferably used also in the invention.

The carrier carrying a dye (color material) may be used as it is or in combination with a dispersant, if required. As the dispersant, the dispersant described later can be preferably used.

The pigment described above may be used alone or in combination of two or more kinds of pigments selected from any one or more of the groups described above.

The content of the color material (particularly pigment) in the ink composition is preferably from 1 to 25% by mass, more preferably from 1 to 15% by mass, and still more preferably from 2 to 10% by mass, with respect to the total mass of the ink composition, from the viewpoint of color density, granularity, ink stability, and jetting reliability.

Dispersant

When the color material in the invention is a pigment, it is preferable that the color material forms a part of color-material particles dispersed in an aqueous solvent by a dispersant. As the dispersant, a polymer dispersant or a low-molecular-weight surfactant-type dispersant may be used. As the polymer dispersant, any of a water-soluble polymer dispersant and a water-insoluble polymer dispersant may be used.

In the invention, a water-insoluble polymer dispersant is preferable from the viewpoint of dispersion stability and jetting properties when applied to an ink-jet method.

Water-Insoluble Polymer Dispersant

As the water-insoluble polymer dispersant in the invention (hereinafter sometimes simply referred to as a "dispersant"), a known water-insoluble polymer dispersant may be used without particular limitation insofar as it is a water-insoluble polymer and can disperse a pigment. The water-insoluble polymer dispersant may contain both a hydrophobic structural unit and a hydrophilic structural unit, for example.

Examples of monomers for forming a part of the hydrophobic structural unit include a styrene monomer, alkyl (meth)acrylate, and (meth)acrylate containing an aromatic group.

A monomer for forming a part of the hydrophilic structural unit is not particularly limited insofar as the monomer contains a hydrophilic group. Examples of the hydrophilic group include a nonionic group, a carboxyl group, a sulfonic acid group, and a phosphoric acid group. Examples of the nonionic group include a hydroxyl group, an amide group (in which the nitrogen atom is not substituted), a group derived from an alkylene oxide polymer (for example, polyethylene oxide and polypropylene oxide) and a group derived from sugar alcohol.

The hydrophilic structural unit in the invention preferably contains at least a carboxyl group from the viewpoint of dispersion stability and also preferably contains both a nonionic group and a carboxyl group.

Specific examples of the water-insoluble polymer dispersant in the invention include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol(meth)acrylate-(meth)acrylic acid copolymer, and a styrene-maleic acid copolymer.

Here, the "(meth)acrylic acid" refers to acrylic acid or methacrylic acid.

In the invention, the water-insoluble polymer dispersant is preferably a vinyl polymer containing a carboxyl group and more preferably a vinyl polymer having at least a structural unit derived from an aromatic group-containing monomer as the hydrophobic structural unit and having a structural unit containing a carboxyl group as the hydrophilic structural unit, from the viewpoint of the dispersion stability of a pigment.

The weight average molecular weight of the water-insoluble polymer dispersant is preferably from 3,000 to 200,000, more preferably from 5,000 to 100,000, still more preferably from 5,000 to 80,000, and particularly preferably from 10,000 to 60,000, from the viewpoint of the dispersion stability of a pigment.

The content of the dispersant in the color-material particles in the invention is preferably from 10 to 100% by mass, more preferably from 20 to 70% by mass, and particularly preferably from 30 to 50% by mass, with respect to the content of the pigment, from the viewpoint of the dispersibility, ink coloring properties, and dispersion stability of the pigment.

When the content of the dispersant in the color-material particles is in the range mentioned above, the pigment is coated with a proper amount of a dispersant, and color-material particles having a small particle diameter and excellent stability with time are tend to be obtained. Thus, the content mentioned above is preferable.

The color-material particles in the invention may contain an additional dispersant in addition to the water-insoluble polymer dispersant. For example, a known water-soluble low-molecular-weight dispersant, a water-soluble polymer, and the like may be used. The content of dispersants other than the water-insoluble polymer dispersant can be adjusted within the range of the content of the dispersant described above.

The color material in the invention preferably contains the pigment and the water-insoluble polymer dispersant, from the viewpoint of dispersion stability and jetting properties, and preferably has a structure in which at least a part of the surface of the pigment is coated with the water-insoluble polymer dispersant. Such a color material may be obtained as a dispersion of color-material particles by, for example, dispersing a mixture containing, for example, a pigment, a dispersant, and if required, a solvent (preferably an organic solvent), and the like with a disperser.

The dispersion of the color-material particles may be manufactured as a dispersion by, for example, a process of adding an aqueous solution containing a basic substance to a mixture of the pigment, the water-insoluble polymer dispersant, and an organic solvent that dissolves or disperses the dispersant (mixture-hydration process), and a subsequent process of removing the organic solvent (solvent removal process). Thus, the color material is finely dispersed, and a dispersion of the color-material particles excellent in storage stability can be produced.

The organic solvent needs to be able to dissolve or disperse the dispersant and, in addition thereto, preferably has a specific degree of affinity with water. Specifically, the solubility in water under 20° C. is preferably from 10% by mass to 50% by mass.

More specifically, the dispersion of the color-material particles may be manufactured by a manufacturing method including the following processes (1) and (2) but the manufacturing method is not limited thereto.

Process (1): Process of performing a dispersion treatment of a mixture containing a pigment, a dispersant, and an organic solvent that dissolves or disperses the dispersant, and a solution containing a basic substance and containing water as the main component, and Process (2); Process of removing at least a part of the organic solvent from the mixture after the dispersion treatment.

In the process (1), first, the dispersant is dissolved or dispersed in an organic solvent, thereby obtaining a mixture (mixture process). Next, a solution containing a color material and a basic substance and containing water as the main component, water and, if required, a surfactant and the like are added to the mixture obtained above, mixed, and dispersed, thereby obtaining an oil-in-water dispersion.

The basic substance is used for neutralizing an anionic group (preferably a carboxyl group) which is contained in a polymer in some cases. The degree of neutralization of the anionic group is not particularly limited. Usually, the dispersion of the color-material particles to be finally obtained preferably has a pH of from 4.5 to 10, for example. The pH may also be determined in accordance with a desired degree of neutralization of the polymer.

Preferable examples of the organic solvent include an alcohol solvent, a ketone solvent, and an ether solvent. Among the above, examples of the alcohol solvent include ethanol, isopropanol, n-butanol, tertiary butanol, isobutanol, and diacetone alcohol. Examples of the ketone solvent include acetone, methyl ethyl ketone, diethyl ketone, and methyl isobutyl ketone. Examples of the ether solvent include dibutyl ether, tetrahydrofuran, and dioxane. Among these solvents, isopropanol, acetone, and methyl ethyl ketone are preferable and methyl ethyl ketone is particularly preferable. The organic solvent may be used alone or two or more kinds of the organic solvents may be used in combination.

In the manufacturing of the dispersion of the color-material particles, kneading and dispersion treatment may be performed while giving strong shearing force using a two-roll mill, a three-roll mill, a ball mill, a tron mill, a disper, a kneader, a co-kneader, a homogenizer, a blender, a uniaxial or biaxial extruder, or the like. The details of kneading and dispersion are described in "Paint Flow and Pigment Dispersion" written by T. C. Patton (published by John Wiley and Sons, 1964), and the like.

As required, the dispersion of the color-material particles may be obtained by performing fine dispersion treatment using beads made of glass, zirconia, or the like having a particle diameter of from 0.01 to 1 mm using a vertical or horizontal type sand grinder, a pin mill, a slit mill, an ultrasonic disperser, or the like.

The removal of the organic solvent in the method for manufacturing the dispersion of the color-material particles can be achieved by a known method such as distillation under reduced pressure or the like, without being particularly limited.

The color-material particles in the dispersion of the color-material particles thus obtained maintain a favorable dispersion state, and the obtained dispersion of the color-material particles achieves excellent stability with time.

In the present invention, the volume average particle diameter of the color material (or the color-material particles) is preferably from 10 nm to 200 nm, more preferably from 10 nm to 150 nm, and still more preferably from 10 nm to 100 nm. When the volume average particle diameter is 200 nm or less, color reproducibility may become satisfactory, and in the case of an ink-jet system, droplet jetting properties may become satisfactory. When the volume average particle diameter is 10 nm or more, lightfastness may become satisfactory.

The volume average particle diameter and particle size distribution of the color material (or the color-material particles), specifically, the volume average particle diameter and particle size distribution of the pigment in the dispersed state can be determined in accordance with a dynamic light scattering method, using a particle size distribution measuring device (trade name: MICROTRAC VERSION 10. 1. 2-211BH, manufactured by Nikkiso Co., Ltd.).

There is no particular limitation as to the particle size distribution of the color material (or the color-material particles). The color material (or the color-material particles) may have a broad particle size distribution or a monodispersed particle size distribution. Two or more kinds of color materials each having a monodispersed particle size distribution may be mixed and used.

The volume average particle diameter and particle size distribution of the color material (or the color-material particles) can be measured, for example, using a light scattering method.

In the present invention, one kind of the above-described color materials (or the color-material particles) may be used alone, or two or more kinds of them may be used in combination.

Water-Soluble Organic Solvent

It is preferable that the ink composition of the present invention contains at least one water-soluble organic solvent. When a water-soluble organic solvent is contained, effects of preventing drying, moisturizing, or accelerating penetration can be obtained. Specifically, for the purpose of preventing drying, a water-soluble organic solvent is used as an anti-drying agent that prevents clogging of jetting nozzles, which may be caused due to aggregation generated by attachment and drying of an ink at an ink jetting orifice. For the purpose of preventing drying or moisturizing, a water-soluble organic solvent which has a vapor pressure lower than that of water is preferably used. Further, a water-soluble organic solvent may be used as a penetration accelerator that enhances permeability of ink into paper. Here, the "water solubility" in the water-soluble organic solvent means that the organic solvent dissolves in distilled water at 25° C. in an amount of 0.5% by mass or more. The water-soluble organic solvent dissolves in distilled water at 25° C. in an amount of preferably 1% by mass or more, and more preferably 3% by mass or more.

Examples of the water-soluble organic solvent include alkane diol (a polyvalent alcohol) such as glycerin, 1,2,6-hexanetriol, trimethylolpropane, ethylene glycol, and propylene glycol; a sugar alcohol; an alkyl alcohol having 1 to 4 carbon atoms such as ethanol, methanol, butanol, propanol, and isopropanol; and a glycol ether such as ethylene glycol monomethyl ether, ethylene glycol monoethyl ether, ethylene glycol monobutyl ether, ethylene glycol monomethyl-ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether. The water-soluble organic solvent may be used alone or two or more kinds thereof may be used in combination.

For the purpose of preventing drying or moisturizing, a polyvalent alcohol is useful. Examples include glycerin, ethylene glycol, diethylene glycol, triethylene glycol, propylene glycol, dipropylene glycol, tripropylene glycol, 1,3-butanediol, and 2,3-butanediol. These substances may be used alone or in combination of two or more kinds thereof.

For the purpose of accelerating penetration, a polyol compound is preferable and an aliphatic diol is suitable. Examples of the aliphatic diol include 2-ethyl-2-methyl-1,3-propane diol, 3,3-dimethyl-1,2-butanediol, 2,2-diethyl-1,3-propane diol, 2-ethyl-1,3-hexanediol, and 2,2,4-trimethyl-1,3-pentane diol. Among the above, preferable examples include 2-ethyl-1,3-hexanediol and 2,2,4-trimethyl-1,3-pentane diol.

The water-soluble organic solvent in the invention preferably contains at least one kind of the compound represented by the following Formula (1) in view of suppressing the occurrence of curling of a recording medium.

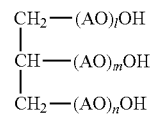

Formula (1)

In Formula (1), l, m, and n each independently represent an integer of 1 or more and satisfy l+m+n=3 to 15, where l+m+n is preferably in a range of from 3 to 12, and more preferably from 3 to 10. When the value of l+m+n is 3 or more, favorable curl-suppression properties are exhibited, and when the value of l+m+n is 15 or less, favorable jetting properties are obtained. In Formula (1), AO represents at least one of ethylene oxy (EO) or propylene oxy (PO), and in particular, a propylene oxy group is preferable. The respective AO in $(AO)_l$, $(AO)_m$, and $(AO)_n$ above may be the same as or different from each other.

Hereinafter, examples of the compound represented by Formula (1) are shown. However, the invention is not limited thereto. In the following Exemplified Compounds, the description "POP(3) glyceryl ether" refers to a glyceryl ether in which a total of three propylene oxy groups are bonded to glycerin, and the same principle applies to the other descriptions.

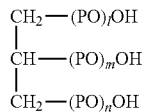

l+m+n=3 POP(3) glyceryl ether
l+m+n=4 POP(4) glyceryl ether
l+m+n=5 POP(5) glyceryl ether
l+m+n=6 POP(6) glyceryl ether
l+m+n=7 POP(7) glyceryl ether The water-soluble organic solvent in the invention is also preferably a water-soluble organic solvent shown below in view of suppressing the occurrence of curling of a recording medium.

n-$C_4H_9O(AO)_4$—H (AO=EO or PO, Ratio: EO:PO=1:1)
n-$C_4H_9O(AO)_{10}$—H (AO=EO or PO, Ratio: EO:PO=1:1)
HO $(AO)_{40}$—H (AO=EO or PO, Ratio: EO:PO=1:3)
HO $(AO)_{55}$—H (AO=EO or PO, Ratio: EO:PO=5:6)
HO$(PO)_3$—H
HO$(PO)_7$—H
1,2-hexanediol The content ratio of the compound represented by Formula (1) and the Exemplified Compounds in the total of the water-soluble organic solvents is preferably 3% by mass or more, more preferably 4% by mass or more, and still more preferably 5% by mass or more. By adjusting the content in the range above, curling can be suppressed without deteriorating the stability or jetting properties of ink. Thus, the range is preferable.

In the invention, the water-soluble organic solvent may be used alone or a mixture of two or more kinds thereof may be used.

The content of the water-soluble organic solvent in the ink composition is preferably from 1% by mass to 60% by mass and more preferably from 5% by mass to 40% by mass.

Resin Particles

The ink composition in the invention preferably contains at least one kind of resin particles. When resin particles are contained in the ink composition, the fixability of the ink composition to a recording medium, the scratch resistance of an image, and blocking resistance can be effectively improved.

The resin particles preferably have a function of fixing the ink composition, that is, an image, by increasing the viscosity of ink by aggregation or destabilization of dispersion when contacting a treatment liquid described below or a region on a recording medium to which the treatment liquid has been applied and dried. Such resin particles are preferably dispersed in water and at least one kind of the organic solvent.

Examples of resin particles in the invention include acrylic resin, vinyl acetate resin, styrene-butadiene resin, vinyl chloride resin, acrylic-styrene resin, butadiene resin, styrene resin, crosslinked acrylic resin, crosslinked styrene resin, benzoguanamine resin, phenol resin, silicone resin, epoxy resin, urethane resin, paraffin resin, and fluororesin or a latex thereof. Preferable examples include acrylic resin, acrylic-styrene resin, styrene resin, crosslinked acrylic resin, and crosslinked styrene resin.

The resin particles may also be used in a form of latex.

The weight average molecular weight of the resin particles is preferably from 10,000 to 200,000 and more preferably from 100,000 to 200,000.

The volume average particle diameter of the resin particles is preferably in the range of from 10 nm to 1 μm, more preferably in the range of from 10 to 200 nm, still more preferably in the range of from 20 to 100 nm, and particularly preferably in the range of from 20 to 50 nm.

The glass transition temperature Tg of the resin particles is preferably 30° C. or more, more preferably 40° C. or more, and still more preferably 50° C. or more.

The addition amount of the resin particles is preferably from 0.1 to 20% by mass, and still more preferably from 0.1 to 15% by mass, with respect to the mass of the ink.

The particle size distribution of the resin particles is not particularly limited and may be any of a broad particle size distribution or a monodispersed particle size distribution. Two or more kinds of resin particles having a monodispersed particle diameter distribution may be mixed and used.

Surfactant

The ink composition in the invention may contain at least one kind of a surfactant if required. The surfactant may be used as a surface tension adjuster.

As the surface tension adjuster, a compound having both a hydrophilic portion and a hydrophobic portion in a molecule thereof, and the like can be effectively used, and any of an anionic surfactant, a cationic surfactant, an amphoteric surfactant, a nonionic surfactant, and a betaine surfactant may be used. The dispersant (polymer dispersant) described above may also be used as the surfactant.

In the invention, from the viewpoint of suppressing interference of jetted ink droplets, the nonionic surfactant is preferable and particularly an acetylene glycol derivative is more preferable.

When the surfactant (surface tension adjuster) is contained in the ink composition, the surfactant is preferably contained in an amount such that the surface tension of the ink composition can be adjusted to 20 to 60 mN/m from the viewpoint of favorably jetting the ink composition by an ink-jet method and, in terms of the surface tension, the surface tension is more preferably from 20 to 45 mN/m and still more preferably from 25 to 40 mN/m.

The amount of the surfactant contained in the ink composition is not particularly limited and is preferably such an amount as to achieve an ink surface tension in a preferable range as described above. The specific amount of the surfactant contained in the ink composition is preferably 1% by mass or more, more preferably from 1 to 10% by mass, and still more preferably from 1 to 3% by mass.

Other Ingredients

The ink composition may further contain various additives as other ingredients as required in addition to the ingredients described above.

Examples of various additives include a known additive such as a UV absorber, an anti-fading agent, an antifungal agent, a pH adjuster, an anticorrosive agent, an antioxidant, an emulsion stabilizer, an antiseptic agent, a defoaming agent, a viscosity adjuster, a dispersion stabilizer, a chelating agent, and a solid wetting agent.

Examples of the UV absorber include a benzophenone UV absorber, a benzotriazole UV absorber, a salicylate UV absorber, a cyanoacrylate UV absorber, and a nickel complex salt UV absorber.

Examples of the anti-fading agent include various kinds of organic and metal complex anti-fading agents. Examples of the organic anti-fading agent include hydroquinones, alkoxy phenols, dialkoxy phenols, phenols, anilines, amines, indans, chromans, alkoxy anilines, and heterocycles. Examples of the metal complex include a nickel complex and a zinc complex.

Examples of the antifungal agent include sodium dehydroacetate, sodium benzoate, sodium pyridinethion-1-oxide, p-hydroxybenzoic acid ethyl ester, 1,2-benzisothiazoline-3-on, sodium sorbate, and sodium pentachlorophenol.

The content of the antifungal agent in the ink composition is preferably in the range of from 0.02 to 1.00% by mass.

As the pH adjuster, any pH adjuster can be suitably selected according to the purpose without particular limitation insofar as the pH can be adjusted to a desired value without adversely affecting the ink composition to be prepared. Examples include alcohol amines (for example, diethanolamine, triethanolamine, and 2-amino-2-ethyl-1,3-propanediol), alkali metal hydroxides (for example, lithium hydroxide, sodium hydroxide, and potassium hydrate), ammonium hydroxides (for example, ammonium hydroxide and quaternary ammonium hydroxide), phosphonium hydroxide, and alkaline metal carbonate.

Examples of the anticorrosive agent include acidic sulfite, sodium thiosulfate, ammonium thiodiglycolate, diisopropylammonium nitrite, pentaerythritol tetranitrate, and dicyclohexylammonium nitrite.

Examples of the antioxidant include a phenolic antioxidant (including a hindered phenolic antioxidant), an amine antioxidant, a sulfur antioxidant, and a phosphorous antioxidant.

Examples of the chelating agent include sodium ethylenediaminetetraacetate, sodium nitrilotriacetate, sodium hydroxyethyl ethylenediamine triacetate, sodium diethylenetriamine pentaacetate, and sodium uramil diacetate.

Physical Properties of Ink Composition

The surface tension (25° C.) of the ink composition in the invention is preferably from 20 mN/m to 60 mN/m. The surface tension is more preferably from 20 mN/m to 45 mN/m and still more preferably from 25 mN/m to 40 mN/m.

The surface tension is determined by measuring the ink composition under the condition of 25° C. using an Automatic Surface Tensiometer CBVP-Z (trade name, manufactured by Kyowa Interface Science Co., LTD.).

The viscosity at 25° C. of the ink composition in the invention is preferably from 1.2 mPa·s to 15.0 mPa·s, more preferably from 2 mPa·s but less than 13 mPa·s, and still more preferably from 2.5 mPa·s but less than 10 mPa·s.

The viscosity is determined by measuring the ink composition under the condition of 25° using a VISCOMETER TV-22 (trade name, manufactured by TOKI SANGYO CO.LTD).

Ink Set

The ink set of the present invention includes at least one of the ink compositions as described above and at least one treatment liquid containing an aggregating agent capable of forming an aggregate when the treatment liquid contacts the ink composition.

By forming an image using the ink composition containing the above-described modified polyallylamine or modified polyvinylamine having an ethylenically unsaturated double bond in a side chain thereof and the polymerization initiator together with the treatment liquid containing the aggregating agent, an image having good image quality and high curability may be formed.

Treatment Liquid

The treatment liquid included in the ink set of the invention contains at least one kind of the aggregating agent capable of forming an aggregate when contacting the ink composition, and other ingredients as necessary.

Since the treatment liquid contains the aggregating agent, an image having favorable image quality can be formed.

Aggregating Agent

The treatment liquid in the invention contains an aggregating agent that aggregates an ingredient in the ink composition. The aggregating agent in the invention can aggregate (fix) the ink composition when contacting the ink composition on a recording medium, and functions as a fixing agent. For example, in a state in which the aggregating agent is present on a recording medium (preferably a coated paper) by applying the treatment liquid to the recording medium, droplets of the ink composition are applied and contact the aggregating agent, and thus the ingredient in the ink composition aggregates and the ingredient in the ink composition can be fixed on the recording medium.

Examples of the aggregating agent that fixes the ingredient in the ink composition include an acidic compound, a polyvalent metal salt, and a cationic polymer. The aggregating agent may be used alone or two or more kinds thereof may be used in combination.

Acidic Compound

Preferable examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, and salts thereof.

Among the above, an acidic compound having high water solubility is preferable. From the viewpoint of reacting with the ink composition and fixing the entire ink, a trivalent or lower valent acidic compound is preferable, and a divalent to trivalent acidic compound is particularly preferable.

The acidic compound may be used alone or two or more kinds thereof may be used in combination.

When the treatment liquid contains the acidic compound, the pH (25° C.) of the treatment liquid is preferably from 0.1 to 6.8, more preferably from 0.5 to 6.0, and still more preferably from 0.8 to 5.0.

The content of the acidic compound is preferably 40% by mass or less and more preferably from 15 to 40% by mass, with respect to the total mass of the treatment liquid. By adjusting the content of the acidic compound to 15 to 40% by mass, the ingredient in the ink composition can be more efficiently fixed.

The content of the acidic compound is preferably from 15% by mass to 35% by mass and more preferably 20% by mass to 30% by mass, with respect to the total mass of the treatment liquid.

The application amount of the acidic compound to the recording medium is not particularly limited insofar as the amount is sufficient for aggregating the ink composition. From the viewpoint of ease of fixation of the ink composition, the application amount is preferably from 0.5 $g/m^2$ to 4.0 $g/m^2$ and more preferably from 0.9 $g/m^2$ to 3.75 $g/m^2$.

Polyvalent Metal Salt

The polyvalent metal salt in the invention is a compound containing a divalent or higher valent metal such as an alkaline earth metal, a zinc group metal, and the like.

In the invention, the aggregation reaction of the ink composition when the ink composition is jetted to a recording medium (preferably a coated paper) to which the treatment liquid containing the polyvalent metal salt has been applied can be achieved by reducing the dispersion stability of the particles dispersed in the ink composition, for example, the color material such as a pigment, particles such as resin particles, or the like, and increasing the viscosity of the entire ink composition. For example, when the pigments or the particles such as resin particles, in the ink composition have a weak acid functional group such as a carboxyl group or the like, the particles are stably dispersed due to the function of the weak acid functional group but the dispersion stability can be reduced by reducing the surface charge of the particles by interaction with the polyvalent metal salts. Accordingly, from the viewpoint of the aggregation reaction, the polyvalent metal salt as a fixing agent contained in the treatment liquid needs to be divalent or higher valent, that is, polyvalent, and, from the viewpoint of the aggregation reactivity, the polyvalent metal salt is preferably a polyvalent metal salt containing a trivalent or higher valent metal ion.

From the viewpoints described above, the polyvalent metal salt that can be used in the treatment liquid in the invention is preferably at least any one of a salt of a polyvalent metal ion and a negative ion described below, polyaluminum hydroxide, and polyaluminum chloride.

Examples of the polyvalent metal ion include $Ca^{2+}$, $Cu^{2+}$, $Ni^{2+}$, $Mg^{2+}$, $Sr^{2+}$, $Zn^{2+}$, $Ba^{2+}$, $Al^{3+}$, $Fe^{3+}$, $Cr^{3+}$, $Co^{3+}$, $Fe^{2+}$, $La^{3+}$, $Nd^{3+}$, $Y^{3+}$, and $Zr^{4+}$. In order to blend the polyvalent metal ion into the treatment liquid, a salt of the polyvalent metal may be used.

The salt refers to a metal salt containing the polyvalent metal ion described above and a negative ion to be bonded to the polyvalent metal ion, and is preferably soluble in a solvent. Here, the solvent refers to a medium forming a part of the treatment liquid together with the polyvalent metal salt and examples include water or an organic solvent described below.

Examples of the preferable negative ion for forming a salt with the polyvalent metal ion include $Cl^-$, $NO_3^-$, $I^-$, $Br^-$, $ClO_3^-$, $CH_3COO^-$, and $SO_4^{2-}$.

The polyvalent metal ion and the negative ion can form a salt of the polyvalent metal ion and the negative ion using one kind of the polyvalent metal ion and one kind of the negative ion alone or in combination of two or more kinds of the polyvalent metal ions and two or more kinds of the negative ions.

Examples of the polyvalent metal salt other than the above include polyaluminum hydroxide and polyaluminum chloride.

In the invention, in view of reactivity or coloring properties, ease of handling and the like, the salt of the polyvalent metal ion and the negative ion is preferably used. As the polyvalent metal ion, at least one selected from $Ca^{2+}$, $Mg^{2+}$, $Sr^{2+}$, $Al^{3+}$, and $Y^{3+}$ is preferable, and $Ca^{2+}$ is more preferable.

As the negative ion, $NO_3^-$ is particularly preferable from the viewpoint of solubility or the like.

The polyvalent metal salt may be used alone or two or more kinds thereof may be mixed and used.

The content of the polyvalent metal salt is preferably 15% by mass or more with respect to the total mass of the treatment liquid. By adjusting the content of the polyvalent metal salt to 15% by mass or more, the ingredient in the ink composition can be more effectively fixed.

The content of the polyvalent metal salt is more preferably from 15% by mass to 35% by mass and particularly preferably from 20% by mass to 30% by mass, with respect to the total mass of the treatment liquid.

The application amount of the polyvalent metal salt to a recording medium is not particularly limited insofar as the amount is sufficient for aggregating the ink composition. From the viewpoint of ease of fixation of the ink composition, the amount is preferably from 0.5 $g/m^2$ to 4.0 $g/m^2$ and more preferably from 0.9 $g/m^2$ to 3.75 $g/m^2$.

Cationic Polymer

Examples of the cationic polymer include at least one kind of a cationic polymer selected from a poly(vinylpyridine) salt, polyalkylaminoethyl acrylate, polyalkylaminoethyl methacrylate, poly(vinylimidazole), polyethyleneimine, polybiguanide, and polyguanide.

The cationic polymer may be used alone or two or more kinds thereof may be used in combination.

Among the above cationic polymers, polyguanide (preferably poly(hexamethylene guanidine)acetate, polymonoguanide, and polymeric biguanide), polyethyleneimine, and poly(vinylpyridine) is preferable since it is advantageous in the aggregation rate.

The weight average molecular weight of the cationic polymer is preferably smaller in terms of the viscosity of the treatment liquid. When the treatment liquid is applied to a recording medium by an ink-jet method, the weight average molecular weight is preferably in the range of from 500 to 500,000, more preferably in the range of from 700 to 200,000, and still more preferably in the range of from 1,000 to 100,000. The weight average molecular weight of 500 or more is advantageous in the aggregation rate and the weight average molecular weight of 500,000 or less is advantageous in the jetting reliability. However, the same does not necessarily apply to the case where the treatment liquid is applied to a recording medium by methods other than the ink-jet method.

When the treatment liquid contains the cationic polymer, the pH (25° C.) of the treatment liquid is preferably from 1.0 to 10.0, more preferably from 2.0 to 9.0, and still more preferably from 3.0 to 7.0.

The content of the cationic polymer is preferably from 1% by mass to 35% by mass and more preferably from 5% by mass to 25% by mass, with respect to the total mass of the treatment liquid.

The application amount of the cationic polymer to a recording medium (coated paper) is not particularly limited insofar as the amount is sufficient for aggregating the ink composition. From the viewpoint of ease of fixation of the ink composition, the application amount is preferably from 0.5 $g/m^2$ to 4.0 $g/m^2$ and more preferably from 0.9 $g/m^2$ to 3.75 $g/m^2$.

Image Forming Method

The scope of an image forming method of the invention includes at least a treatment liquid application process of applying the treatment liquid contained in the ink set onto a recording medium, an ink application process of applying the ink composition contained in the ink set onto a recording medium to form an image, and optionally other processes, as necessary.

Recording Medium

The recording medium for use in the image forming method of the invention is not particularly limited, and may be a general printing paper containing cellulose as the major component such as high-quality paper, coat paper or art paper for use in general offset printing and the like. When image recording is performed on the general printing paper containing cellulose as the major component by a general ink-jet method with an ink, absorption and drying of the ink is relatively slow, and color material migration likely occurs after jetting ink droplets, whereby image quality is apt to degrade. However, when image recording is conducted by the image forming method according to the present invention, a high-grade image recording having excellent color density and hue can be achieved while suppressing the color material migration.

The recording medium may be a commercially-available product, and examples thereof include high-quality papers (A) such as PRINCE WOOD FREE (tradename) manufactured by Oji Paper Co., Ltd., SHIRAOI (tradename) manufactured by Nippon Paper Industries Co., Ltd., and New NPI jo-shitsu (New NPI high-quality; tradename) manufactured by Nippon Paper Industries Co., Ltd.; high-quality coat papers such as SILVER DIAMOND (tradename) and U-LIGHT (tradename) both manufactured by Nippon Paper Industries Co., Ltd.; very light-weight coated papers such as EVER LIGHT COATED (tradename) manufactured by Oji Paper Co., Ltd. and AURORA S (tradename) manufactured by Nippon Paper Industries Co., Ltd.; lightweight coat papers (A3) such as TOPKOTE (L) (tradename) manufactured by Oji Paper Co., Ltd. and AURORA L (tradename) manufactured by Nippon Paper Industries Co., Ltd.; coat papers (A2, B2) such as TOPKOTE PLUS (tradename) manufactured by Oji Paper Co., Ltd. and AURORA COAT (tradename) manufactured by Nippon Paper Industries Co., Ltd.; and art papers (A1) such as KINFUJI (2/SIDE GOLDEN CASK GLOSS) (tradename) manufactured by Oji Paper Co., Ltd. and TOKUBISHI ART (tradename) manufactured by Mitsubishi Paper Mills Ltd. As the recording medium, various inkjet-recording papers exclusively for photos may be used.

Among the above, from the viewpoint of obtaining a high-quality image having better color density and hue than conventionally and having an effect of highly suppressing color material migration, a water absorption coefficient Ka of the recording medium is preferably from 0.05 to 0.5 $mL/m^2 \cdot ms^{1/2}$, more preferably from 0.1 to 0.4 $mL/m^2 \cdot ms^{1/2}$, and still more preferably from 0.2 to 0.3 $mL/m^2 \cdot ms^{1/2}$.

The water absorption coefficient Ka has the same meaning as that described in JAPAN TAPPI pulp and paper test method No. 51:2000 (published by Japan Technical Association of the Pulp and Paper Industry). Specifically, the water absorption coefficient Ka is determined by calculating the difference in the amount of transferred water between at a contact time of 100 ms and at a contact time of 900 ms measured with an automatic scanning liquid absorptometer KM500Win (trade name, manufactured by Kumagai Riki Kogyo Co., Ltd.).

Among the recording media, a so-called coated paper for use in general offset printing is preferable. The coated paper is obtained by applying a coating material to a surface of general non-surface-treated high-quality paper containing cellulose as the major component, neutralized paper or the like to form a coating layer thereon. In usual image forming by an ink-jet method, the coated paper is likely to cause a problem in quality such as image glossiness, scratch resistance, or the like. However, when image recording is conducted by the image forming method according to the present invention, an image having favorable glossiness and scratch resistance can be obtained while suppressing uneven glossiness. In particular, coated paper having a base paper and a coating layer containing kaolin and/or calcium bicarbonate is preferably used. More specifically, art paper, coat paper, lightweight coat paper, and very light-weight coated paper are more preferable.

Treatment Liquid Application Process

In the treatment liquid application process, the treatment liquid that contains an aggregating agent, may contain an acid generating agent, and is contained in the ink set is applied onto a recording medium. For the application of the treatment liquid to the recording medium, a known liquid application method can be used without particular limitation, and an appropriate method such as spray coating, coating with a coating roller or the like, application by an ink-jet method, or immersion, may be selected.

Specific examples include a size press method such as a horizontal size press method, a roll coater method, a calendar size press method; a knife coater method such as an air knife coater method; a roll coater method such as a transfer roll coater method (for example, a gate roll coater method), a direct roll coater method, a reverse roll coater method, a squeeze roll coater method; a blade coater method such as a billblade coater method, a short dwell coater method, a two stream coater method; a bar coater method such as a rod bar coater method; a cast coater method; a gravure coater method; a curtain coater method; a die coater method; a brush coater method; and a transfer method.

A method in which coating is performed while controlling the coating amount using a coating apparatus having a liquid amount controlling member as in the case of the coating apparatus described in JP-A No. 10-230201 may be used.

The treatment liquid may be applied to the entire surface of the recording medium, that is, entire surface application, or may be applied to a region on which ink-jet recording is performed in the ink application process, that is, partial surface application. In the invention, from the viewpoint of uniformly adjusting the application amount of the treatment liquid, uniformly recording fine lines, fine image portions, or the like, and suppressing density unevenness such as image unevenness, the entire surface application in which the treatment liquid is applied to the entire surface of a coated paper by coating with a coating roller or the like, is preferable.

Examples of a method of applying the treatment liquid while controlling the application amount of the treatment liquid to the range described above include a method of using an anilox roller. The anilox roller is a roller in which a surface of the roller which is subjected to thermal spray coating with ceramics is processed with laser and is formed into a pyramidal shape, a slant-lined shape, a hexagonal shape, or the like. When the treatment liquid infiltrates dimples provided on the surface of the roller, and contacts the paper surface, is transferred, and the treatment liquid is applied with a coating amount adjusted by the dimples of the anilox roller.

Ink Application Process

In the ink application process in the invention, the ink composition containing the color material, the polymerizable compound, the initiator, and the aqueous medium, contained in the ink set, is applied onto a recording medium. As a method for applying the ink composition, a known ink application method may be used without particular limitation insofar as the ink composition can be applied in the shape of a desired image. Examples include a method of applying the ink composition onto a recording medium by a method such as an ink-jet method, a copying system, or a stamping and transfer system. In particular, from the viewpoint of reducing the size of a recording device and high-speed recordability, a process of applying the ink composition by an ink-jet method is preferable.

Ink-Jet Method

In the image formation by an ink-jet method, the ink composition is jetted onto a recording medium by applying energy, and a colored image is formed. As an ink-jet recording method preferable for the invention, the method described in Paragraphs 0093 to 0105 of JP-A No. 2003-306623 can be applied.

The ink-jet method is not particularly limited and may be any known method such as a charge-control method in which ink is jetted by electrostatic attraction force; a drop-on-demand method (pressure-pulse method) in which a pressure of oscillation of a piezo element is utilized; an acoustic ink-jet method in which ink is jetted by a radiation pressure generated by irradiation of ink with acoustic beams that have been converted from electrical signals; or the like.

The ink-jet head for use in an ink-jet method may be either an on-demand type head or a continuous type head. An ink nozzle to be used when recording is performed by the ink-jet method is not particularly limited and may be selected as appropriate according to purposes.

Examples of the ink-jet method include a method in which a large number of small-volume droplets of an ink having a low density, which is called a photo ink, are jetted; a method in which inks of substantially the same color hue at different densities are used to improve image quality; and a method in which a clear and colorless ink is used.

Regarding the inkjet recording head, there are (i) a shuttle system in which recording is performed while a short serial head having a small length is moved in the width direction of a recording medium in a scanning manner, and (ii) a line system in which a line head having recording devices that are aligned correspondingly to the entire length of one side of a recording medium is used. In the line system, image recording can be performed over the whole of one surface of a recording medium by moving the recording medium in a direction orthogonal to the direction along which the recording devices are aligned, and a conveyance system, such as carriage or the like, which moves the short head in a scanning manner is unnecessary. Since a complicated scan-movement control of the movement of the carriage and the recording medium is unnecessary and only the recording medium is moved, the recording speed can be increased compared to the shuttle system.

In the invention, the order of carrying out the treatment liquid application process and the ink application process is not particularly limited, and an embodiment in which the ink application process is performed after the treatment liquid application process is preferable from the viewpoint of image quality. More specifically, the ink application process is preferably a process of applying the ink composition onto a recording medium to which the treatment liquid has been applied.

Active Energy Ray Irradiation Process

The scope of the image forming method of the invention preferably includes a process of irradiating an active energy ray to the ink composition applied onto the recording medium. By irradiating an active energy ray, the polymerizable compound contained in the ink composition polymerizes to form a cured film containing a color material. Thus, the scratch resistance and blocking resistance of the image are more effectively improved.

The ink composition applied onto the recording medium is cured by irradiating an active energy ray. This is because the initiator contained in the ink composition in the invention decomposes due to the irradiation of the active energy ray to generate an initiation species such as a radical, an acid, a base, and the like, and the initiation species initiates and promotes the polymerization reaction of the polymerizable compound, and the ink composition is cured.

The ink composition is further aggregated (fixed) due to an acid supplied from the acid generating agent contained in the treatment liquid during the radiation of the active energy ray, and thus the quality of an image portion (scratch resistance, blocking resistance, and the like) is improved.

Here, examples of the active energy ray to be used include a rays, y rays, electron beams, X-rays, ultraviolet rays, visible light, and infrared light. For example, the wavelength of the active energy ray is preferably from 200 to 600 nm, more preferably from 300 to 450 nm, and still more preferably from 350 to 420 nm.

The output of active energy ray is preferably 5000 mJ/cm$^2$ or less, more preferably from 10 to 4000 mJ/cm$^2$, and still more preferably from 20 to 3000 mJ/cm$^2$.

As the source of the active energy ray, a mercury lamp or a gas solid laser, and the like are mainly utilized. As the light source to be used for curing an ultraviolet-ray curing ink-jet recording ink, a mercury lamp and a metal halide lamp are widely known. However, there is a strong need for mercury-free devices from the viewpoint of the current environmental protection. The replacement with a GaN semiconductor ultraviolet ray-emitting device is very useful from the industrial and environmental standpoints. LEDs (UV-LEDs) and LDs (UV-LDs) have a small size, a long lifetime, a high efficiency, and a low cost and thus are attracting attention as light sources for photocuring ink-jet.

A light-emitting diode (LED) and a laser diode (LD) can be used as the active energy ray source. In particular, an ultraviolet LED or an ultraviolet LD can be used when an ultraviolet ray source is required. For example, a purple LED in which the main emission spectrum has a wavelength between 365 nm and 420 nm is commercially available from Nichia Corporation.

A particularly preferable active energy ray source in the invention is a UV-LED, and a UV-LED having a peak wavelength of from 350 to 420 nm is particularly more preferable.

Ink Drying Process

The scope of the image forming method of the invention may include an ink drying process of drying and removing an ink solvent (for example, water, a water-soluble organic solvent, or the like) contained in the ink composition applied onto the recording medium, as required. As the ink drying process, generally used methods can be applied without particular limitation insofar as at least a part of the ink solvent can be removed.

For example, ink drying can be performed by a known heating method such as a heater or the like, an air blowing method utilizing air blowing such as a drier or the like, or a combination thereof. Examples of the heating method include a method including giving heat with a heater or the like from the side opposite to the side of the recording medium to which the treatment liquid is applied, a method including blowing warm air or hot air to the surface of the recording medium to which the treatment liquid is applied, and a heating method using an infrared heater, and two or more the heating methods may be performed in combination.

The ink drying process may be performed after the ink application process, and may be performed before or after the active energy ray irradiation process. In the invention, the ink drying process is preferably performed before the active energy ray irradiation process from the viewpoint of curing sensitivity and blocking resistance.

EXAMPLES

Hereinafter, the invention is specifically described with reference to Examples but is not limited to the Examples. Unless otherwise specified, "part(s)" and "%" are all based on mass. The weight average molecular weight is measured with gel permeation chromatography (GPC).

Synthesis of Modified Polyallylamine or Modified Polyvinylamine Having an Ethylenically Unsaturated Double Bond in a Side Chain Thereof.

Synthesis of Compound 1

To a 2 L three-necked flask equipped with a stirrer, 100.0 g of a 15% by mass aqueous solution of polyallylamine (trade name: PAA-1, manufactured by Nitto Boseki Co., Ltd.; weight average molecular weight Mw=1,600), a small amount of p-methoxyphenol, 400 mL of ion exchange resin IRA-400(OH) (trade name: AMBERLITE IRA-400J, manufactured by Organo Corporation; the anion thereof had been changed from to Cl⁻ to OH⁻ ion using an aqueous solution of sodium hydroxide), 300 mL of water, and 400 mL of acetonitrile were added and stirred. Then, 12.4 g of acetyl chloride were added thereto dropwise over one hour at 0° C., and then the resulting mixture was further allowed to react for 2 hours at room temperature. Subsequently, at 0° C., 2.4 g of acrylic acid chloride were added thereto dropwise over 30 minutes, and the mixture was allowed to react for one hour at 0° C. Thereafter, 6.2 g of acetyl chloride were added thereto dropwise over 30 minutes at 0° C., and the resulting mixture was further allowed to react for 2 hours at room temperature. The obtained reaction mixture was filtrated and then acetonitrile was distilled off from the resulting filtrate under reduced pressure. The resulting aqueous solution was reprecipitated with an excess of acetonitrile, and dried. Then, water was again added thereto, thereby obtaining an aqueous solution of the intended compound 1 (solid content of 20%, weight average molecular weight Mw=3,000). The compound 1 is shown below.

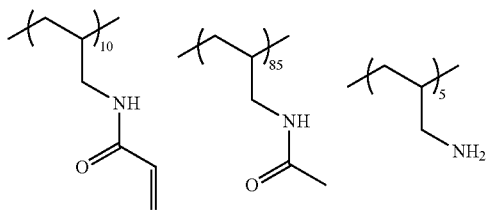

Synthesis of Compound 3

To a 2 L three-necked flask equipped with a stirrer, 100.0 g of a 15% by mass aqueous solution of polyallylamine (trade name: PAA-1, manufactured by Nitto Boseki Co., Ltd.; weight average molecular weight Mw=1,600), a small amount of p-methoxyphenol, 400 mL of ion exchange resin IRA-400(OH) (trade name: AMBERLITE IRA-400J, manufactured by Organo Corporation; the anion thereof had been changed from Cl⁻ to OH⁻ ion using an aqueous solution of sodium hydroxide), 300 mL of water, and 400 mL of acetonitrile were added and stirred. Then, 10.3 g of acetyl chloride were added thereto dropwise over one hour at 0° C., and the mixture was further allowed to react for 2 hours at room temperature. Subsequently, at 0° C., 7.9 g of acrylic acid chloride were added thereto dropwise over 30 minutes, and the resulting mixture was allowed to react for one hour at 0° C. Thereafter, 3.6 g of acetyl chloride were added thereto dropwise over 30 minutes at 0° C., and the resulting mixture was further allowed to react for 2 hours at room temperature. The obtained reaction mixture was filtrated, and then acetonitrile was distilled off from the resulting filtrate under reduced pressure. The resulting aqueous solution was reprecipitated with an excess of acetonitrile, and dried. Then, water was again added thereto, thereby obtaining an aqueous solution of the intended compound 3 (solid content of 20%, weight average molecular weight Mw=3,000). The compound 3 is shown below.

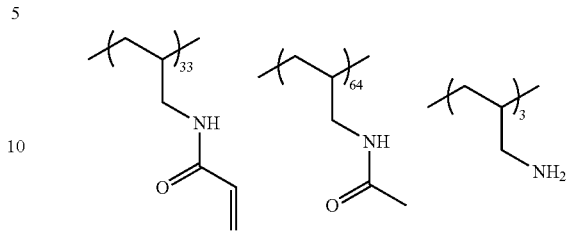

Synthesis of Compound 5

Preparation of an aqueous solution of compound 5 was conducted in accordance with the synthesis method in the synthesis of the compound 3, except that 100.0 g of a 15% by mass aqueous solution of polyallylamine (trade name: PAA-8, manufactured by Nitto Boseki Co., Ltd.; weight average molecular weight Mw=8,000) were used instead of 100.0 g of the 15% by mass aqueous solution of polyallylamine (trade name: PAA-1, manufactured by Nitto Boseki Co., Ltd.; weight average molecular weight Mw=1,600), thereby obtaining an aqueous solution of the compound 5 (solid content of 20%, weight average molecular weight Mw=14,000). The compound 5 is shown below.

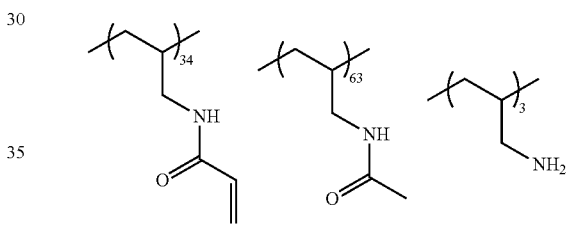

Synthesis of Compound 6

Preparation of an aqueous solution of compound 6 was conducted in accordance with the synthesis method in the synthesis of the compound 3, except that 9.1 g of methacrylic acid chloride were used instead of 7.9 g of acrylic acid chloride, thereby obtaining an aqueous solution of the compound 6 (solid content of 20%, weight average molecular weight Mw=3,000). The compound 6 is shown below.

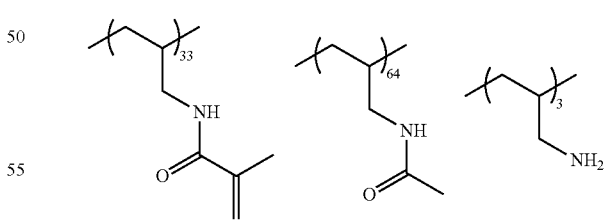

Synthesis of Compound 10

Preparation of an aqueous solution of compound 10 having a structure represented by Formula (I) was conducted in accordance with the synthesis method in the synthesis of the compound 3, except that 100.0 g of a 15% by mass aqueous solution of polyallylamine (trade name: PAA-8, manufactured by Nitto Boseki Co., Ltd.; weight average molecular weight Mw=8,000) were used instead of 100.0 g of the 15% by mass aqueous solution of polyallylamine (trade name:

PAA-1, manufactured by Nitto Boseki Co., Ltd.; weight average molecular weight Mw=1,600), and 17.7 g of succinic anhydride were used instead of 13.9 g of acetyl chloride, thereby obtaining an aqueous solution of the compound 10 (solid content of 20%, weight average molecular weight Mw=21,000). The compound 10 is shown below.

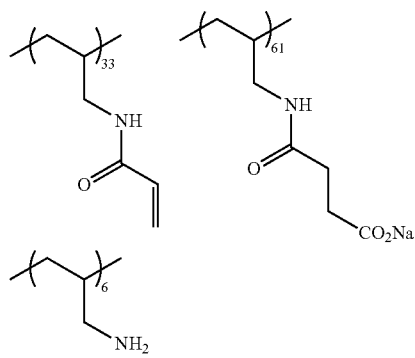

Synthesis of Compound 12

Preparation of an aqueous solution of compound 12 was conducted in accordance with the synthesis method in the synthesis of the compound 3, except that 5.2 g of acrylic chloride were used instead of 7.9 g of acrylic chloride, and 26.7 g of benzoyl chloride were used instead of 13.9 g of acetyl chloride, thereby obtaining an aqueous solution of the compound 12 (solid content of 20%, weight average molecular weight Mw=4,000). The compound 12 is shown below.

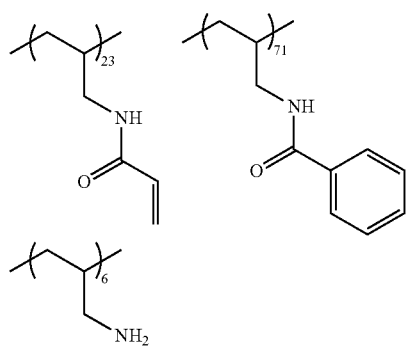

Synthesis of Compound 17

To a 2 L three-necked flask equipped with a stirrer, 75.0 g of a 20% by mass aqueous solution of polyallylamine (trade name: PAA-3, manufactured by Nitto Boseki Co., Ltd.; weight average molecular weight Mw=3,000), a small amount of p-methoxyphenol, 400 mL of ion exchange resin IRA-400(OH) (trade name: AMBERLITE IRA-400J, manufactured by Organo Corporation; the anion thereof had been changed from Cl⁻ to OH⁻ ion using an aqueous solution of sodium hydroxide), 300 mL of water, 400 mL of acetonitrile, and 9.2 g of chloromethylstyrene (trade name: CMS-P, manufactured by Seimi Chemical Co., Ltd.) were added and stirred at room temperature for 15 hours. Then, 20.6 g of acetyl chloride were added thereto dropwise over one hour at 0° C., and the mixture was further allowed to react for 2 hours at room temperature. The obtained reaction mixture was filtrated, and then acetonitrile was distilled off from the resulting filtrate under reduced pressure. The resulting aqueous solution was reprecipitated with an excess of acetonitrile, and dried. Then, water was again added thereto, thereby obtaining an aqueous solution of the intended compound 17 (solid content of 20%, weight average molecular weight Mw=8,000). The compound 17 is shown below.

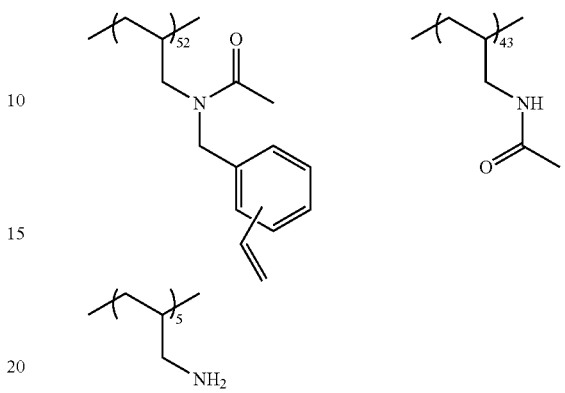

Synthesis of Compound 20

Polyvinylamine having a molecular weight of 5,000 was obtained through the hydrolysis of polyvinyl formamide in accordance with the method described in Japanese Patent Application Publication (JP-B) No. 63-9523. To a 2 L three-necked flask equipped with a stirrer, 10 g of the obtained polyvinylamine, a small amount of p-methoxyphenol, 400 mL of ion exchange resin IRA-400(OH) (trade name: AMBERLITE IRA-400J, manufactured by Organo Corporation; the anion thereof had been changed from Cl⁻ to OH⁻ ion using an aqueous solution of sodium hydroxide), 300 mL of water, and 400 mL of acetonitrile were added and stirred. Then, 10.9 g of acetyl chloride were added thereto dropwise over one hour at 0° C., and the mixture was further allowed to react for 2 hours at room temperature. Subsequently, at 0° C., 4.6 g of acrylic acid chloride were added thereto dropwise over 30 minutes, and the resulting mixture was allowed to react for one hour at 0° C. Thereafter, 3.3 g of acetyl chloride were added thereto dropwise over 30 minutes at 0° C., and the resulting mixture was further allowed to react for 2 hours at room temperature. The obtained reaction mixture was filtrated, and then acetonitrile was distilled off from the resulting filtrate under reduced pressure. The resulting aqueous solution was reprecipitated with an excess of acetonitrile, and dried. Then, water was again added thereto, thereby obtaining an aqueous solution of the intended compound 20 (solid content of 20%, weight average molecular weight Mw=10,000). The compound 20 is shown below.

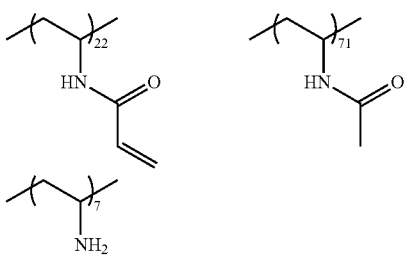

Synthesis of Compound 26

Polyvinylamine having a molecular weight of 10,000 was obtained through the hydrolysis of polyvinyl formamide in accordance with the method described in JP-B No. 63-9523.

To a 2 L three-necked flask equipped with a stirrer, 10.0 g of the obtained polyvinylamine, a small amount of p-methoxyphenol, 400 mL of ion exchange resin IRA-400(OH) (trade name: AMBERLITE IRA-400J, manufactured by Organo Corporation; the anion thereof had been changed from Cl⁻ to OH⁻ ion using an aqueous solution of sodium hydroxide), 300 mL of water, 400 mL of acetonitrile, and 18.3 g of chloromethylstyrene (trade name: CMS-P, manufactured by Seimi Chemical Co., Ltd.) were added and stirred at room temperature for 15 hours. Then, 20.6 g of acetyl chloride were added thereto dropwise over one hour at 0° C., and the mixture was further allowed to react for 2 hours at room temperature. The obtained reaction mixture was filtrated, and then acetonitrile was distilled off from the resulting filtrate under reduced pressure. The resulting aqueous solution was reprecipitated with an excess of acetonitrile, and dried. Then, water was again added thereto, thereby obtaining an aqueous solution of the intended compound 26 (solid content of 20%, weight average molecular weight Mw=17,000). The compound 26 is shown below.

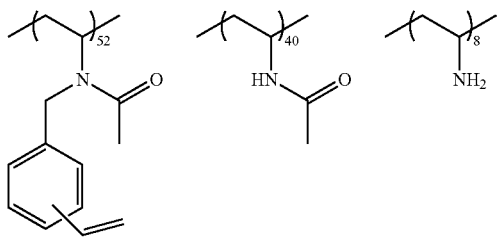

Synthesis of Comparative Compound 1

Synthesis of comparative compound 1 having the structure described below was conducted in accordance with the synthesis method described in JP-A No. 2009-221281.

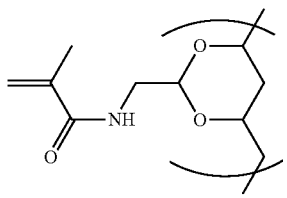

Synthesis of Polymer Dispersant P-1

In a 1000 ml three-necked flask having a stirrer and a condenser tube, 88 g of methyl ethyl ketone was placed, and heated to 72° C. under a nitrogen atmosphere. In the flask, a solution in which 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone was added dropwise over 3 hours. After the dropwise addition was completed, the reaction was further continued for one hour. Then, a solution in which 0.42 g of dimethyl 2,2'-azobisisobutyrate was dissolved in 2 g of methyl ethyl ketone was added, and the mixture was heated to 78° C. and heated for 4 hours. The obtained reaction solution was reprecipitated twice with an excess amount of hexane, and the precipitated resin was dried, thereby obtaining 96 g of a polymer dispersant P-1.

The composition of the obtained resin was confirmed by ¹H-NMR. The weight average molecular weight (Mw) was 44,600 as determined with GPC. The acid value of the obtained resin was 65.2 mgKOH/g as determined by the method described in JIS Standard (JIS-K0070 (1992)).

Preparation of Resin-Coated Pigment Dispersion

Resin-Coated Cyan Pigment Dispersion 10 parts of Pigment Blue 15:3 (Phthalocyanine blue A-220, trade name, manufactured by Dainichiseika Color & Chemicals Mfg. Co., Ltd), 5 parts of the polymer dispersant P-1, 42 parts of methyl ethyl ketone, 5.5 parts of a 1 mol/L aqueous NaOH solution, and 87.2 parts of ion exchange water were mixed, and then the mixture was dispersed in a bead mill for 2 to 6 hours using 0.1 mmφ zirconia beads.

By removing the methyl ethyl ketone and further partially removing water under reduced pressure at 55° C. from the obtained dispersion, a dispersion of a resin-coated cyan pigment (colored particles) having a pigment concentration of 10.2% by mass was obtained.

Resin-Coated Magenta Pigment Dispersion

A dispersion of a resin-coated magenta pigment (colored particles) was obtained in the same manner as in the above preparation of the resin-coated cyan pigment dispersion, except that Chromophthal Jet Magenta DMQ (trade name, Pigment Red 122, manufactured by BASF Japan Ltd.) was used in place of the phthalocyanine blue A-220 as the pigment.

Resin-Coated Yellow Pigment Dispersion

A dispersion of a resin-coated yellow pigment (colored particles) was obtained in the same manner as in the above preparation of the resin-coated cyan pigment dispersion, except that Irgalite Yellow GS (trade name, Pigment Yellow 74, manufactured by BASF Japan Ltd.) was used in place of the phthalocyanine blue A-220 as the pigment.

Resin-Coated Black Pigment Dispersion

A dispersion of a resin-coated black pigment (color-material particles) was obtained in the same manner as in the above preparation of the resin-coated cyan pigment dispersion, except that a pigment dispersion CAB-O-JET™ 200 (trade name, carbon black, manufactured by CABOT Corp.) was used in place of the phthalocyanine blue A-220 as the pigment.

Example 1

Preparation of Ink Set 1

A cyan ink C-1, a magenta ink M-1, a yellow ink Y-1, and a black ink K-1 of the ink formulation 1, and a treatment liquid 1 were individually prepared as follows, and an ink set 1 containing these ink compositions and the treatment liquid 1 was obtained.

Preparation of Cyan Ink C-1

Using the dispersion of the resin-coated cyan pigment, the resin-coated cyan pigment dispersion, ion exchange water, an initiator, a polymerizable compound, and a surfactant were mixed in such a manner as to achieve the following ink formulation 1. Thereafter, the mixture was filtered with a 5 μm membrane filter, thereby preparing the cyan ink C-1 of the ink formulation 1.

Ink Formulation 1

| | |
|---|---|
| Resin-coated cyan pigment dispersion | 6% |
| Irgacure 2959 | 3% |
| (trade name, manufactured by BASF Japan Ltd.) | |
| Compound 1 | 5% |

-continued

| | |
|---|---|
| Hydroxyethyl acrylamide (HEAAm, trade name, manufactured by Tokyo Chemical Industry Co., Ltd.) | 10% |
| Olfine E1010 (trade name, manufactured by Nisshin Chemical Industry Co., Ltd.) | 1% |
| Ion exchange water | Added to be 100% in total |

The pH (25° C.) of the cyan pigmented ink C-1 was measured using a pH meter WM-50EG (trade name, manufactured by TOA DKK CORPORATION), and the pH value was 8.5.

Preparation of Magenta Ink M-1

The magenta ink M-1 of the ink formulation 1 was prepared in the same manner as in the above preparation of the cyan ink C-1, except that the resin-coated magenta pigment dispersion was used in place of the resin-coated cyan pigment dispersion. The pH value was 8.5.

Preparation of Yellow Ink Y-1

The yellow ink Y-1 of the ink formulation 1 was prepared in the same manner as in the above preparation of the cyan ink C-1, except that the resin-coated yellow pigment dispersion was used in place of the resin-coated cyan pigment dispersion. The pH value was 8.5.

Preparation of Black Ink K-1

The black ink K-1 of the ink formulation 1 was prepared in the same manner as in the above preparation of the cyan ink C-1, except that the resin-coated black pigment dispersion was used in place of the resin-coated cyan pigment dispersion. The pH value was 8.5.

Preparation of Treatment Liquid 1

The treatment liquid 1 was prepared by mixing the following materials. The pH (25° C.) of the treatment liquid 1 was 1.0 as measured with a pH meter WM-50EG (trade name) manufactured by TOA DKK CORPORATION Composition of Treatment Liquid 1

| | |
|---|---|
| Malonic acid (manufactured by Tokyo Chemical Industry Co., Ltd.) | 25.0% |
| Tripropylene glycol monomethyl ether (water-soluble organic solvent, manufactured by Tokyo Chemical Industry Co., Ltd.) | 5.0% |
| Ion exchange water | Added to be 100% in total |

Examples 2 to 12

Ink compositions C-2 to C-12, ink compositions M-2 to M-12, ink compositions Y-2 to Y-12, and ink compositions K-2 to K-12 were individually prepared in the same manner as in Example 1, except that other polymerizable compounds were used as shown in Table 1, the amount of Compound 1 was changed as shown in Table 1, or Compounds 3, 5, 6, 10, 12, 17, 20, or 26 were used in place of the Compound 1.

Ink sets 2 to 12 were individually prepared as in the same manner as in the preparation of the ink set 1 prepared from the ink compositions C-1, M-1, Y-1, and K-1, and the treatment liquid 1, except that the treatment liquid 1, and the ink compositions C-2 to C-12, M-2 to M-12, Y-2 to Y-12, and K-2 to K-12 were used.

Comparative Example 1

An ink set C1 was prepared as in the same manner as in Example 1, except that a hydroxyethyl acrylamide was used in place of Compound 1.

Comparative Example 2

An ink set C2 was prepared as in the same manner as in Example 1, except that Comparative Compound 1 was used in place of Compound 1.

Ink-Jet Recording

Tokubishi Art (basis weight: 104.7 g/m$^2$) was prepared as a recording medium (coated paper), and an image was formed as described below. Then, the formed image was evaluated as follows.

Using the ink set 1 containing the cyan ink C-1, the magenta ink M-1, the yellow ink Y-1, and the black ink K-1 obtained above as the ink compositions, a line image and a solid image were formed with the treatment liquid 1 by 4-color single path recording.

The line image was formed by jetting a 1200 dpi line having a 1-dot width, a 1200 dpi line having a 2-dot width, and a 1200 dpi line having a 4-dot width, in the main scanning direction in a single path manner.

The solid image was formed by jetting the ink compositions to the entire surface of the sample obtained by cutting the recording medium into A5 size. Various conditions for recording are as follows.

(1) Treatment Liquid Application Process

The treatment liquid 1 was applied to the entire surface of the recording medium with a roll coater in which the coating amount was controlled by an anilox roller (Number of lines of 100 to 300/inch), so that the application amount was 1.4 g/m$^2$.

(2) Treatment Process

Subsequently, the recording medium to which the treatment liquid 1 was applied was subjected to drying treatment and penetration treatment under the following conditions.

Air blowing rate: 10 m/s

Temperature: The recording medium was heated with a contact type plane heater from the surface opposite to the recorded surface of the recording medium (back surface), so that the surface temperature on the recorded surface side of the recording medium was 60° C.

(3) Ink Application Process

Thereafter, the ink compositions were jetted to the surface of the recording medium to which the treatment liquid 1 was applied, by an ink-jet method under the following conditions, whereby a line image and a solid image were individually formed. In Example 11, the ink compositions were applied to the recording medium by bar-coating, so that the thickness was 3 µm.

Head: Piezo full line heads of 1,200 dpi/20 inch width were provided for 4 colors.

Amount of jetted liquid droplets: 2.0 pL

Driving frequency: 30 kHz (4) Ink Drying Process

Subsequently, the recording medium to which the ink compositions were applied was dried under the following conditions.

Drying method: Air-blow drying

Air blowing rate: 15 m/s

Temperature: The recording medium was heated with a contact type plane heater from the surface opposite to the recorded surface of the recording medium (back surface), so that the surface temperature on the recorded surface side of the recording medium was 60° C.

(5) Active Energy Ray Irradiation Process

Next, the recorded images were irradiated with ultraviolet rays as an active energy ray using a high-pressure mercury lamp (output 120 W/cm$^2$) so that the energy was 1200 mJ/cm$^2$, thereby obtaining evaluation samples on which images were formed.

Evaluation

With regard to the evaluation samples obtained as described above, an ink curability test and an image blocking resistance test were performed as described below. Results are shown in Table 1.

Curability

An un-printed TOKUBISHI ART double-sided N paper (trade name, manufactured by Mitsubishi Paper Mills, Ltd.) was wrapped around a paperweight (weight of 470 g, size of 15 mm×30 mm×120 mm) (contact area between the unprinted TOKUBISHI ART and the evaluation sample: 150 mm$^2$), and then the printed surface of the evaluation sample on which the solid image was formed was rubbed back and forth with the paperweight three times (equivalent to a load of 260 kg/m$^2$). The printed surface after rubbing was visually observed, and then evaluated in accordance with the following evaluation criteria.

Evaluation Criteria

A Peeling of image (color materials) was not visually confirmed on the printed surface.
B Slight peeling of image (color materials) was visually confirmed on the printed surface.
C Peeling of image (color materials) was visually confirmed on the printed surface, at a practically problematic level.

Blocking Resistance

The evaluation sample on which the solid image was formed was left standing for one day and then cut into 2-cm-square pieces, a non-recorded recording medium (the same recording medium as that used for recording (hereinafter referred to as an unused sample in this evaluation)) was disposed on the image-printed surface of the evaluation sample, a 350 kg/m$^2$ load was applied, and then the sample was allowed to stand under the environmental conditions of 60° C. and RH 30% for 24 hours. The unused sample was removed from the evaluation sample. Then, the degree of ink transfer to the blank portion of the unused sample was visually observed, and evaluated in accordance with the following evaluation criteria.

Evaluation Criteria

A: No ink transfer was observed.
B: Ink transfer was not noticeable.
C: A certain degree of ink transfer was observed, at a practically problematic level.
D: Ink transfer was very noticeable.

Ink Storage Stability

The prepared magenta ink was stored, for one week at 50° C., and the degree of precipitation aggregates was visually observed. Evaluation was conducted according to the following evaluation criteria.

A: No precipitation aggregate was observed.
B: Precipitation aggregates were observed.
C: Precipitation aggregates were observed in abundance.

TABLE 1

|  | Ink Set | Modified Polyallylamine or Modified Polyvinylamine Type | Content (%) | Other Polymerizable Compound Type | Content (%) | Curability | Blocking Resistance |
|---|---|---|---|---|---|---|---|
| Example 1 | 1 | Compound 1 | 5 | HEAAm | 10 | B | A |
| Example 2 | 2 | Compound 3 | 5 | HEAAm | 10 | A | A |
| Example 3 | 3 | Compound 5 | 5 | HEAAm | 10 | A | A |
| Example 4 | 4 | Compound 6 | 5 | HEAAm | 10 | A | A |
| Example 5 | 5 | Compound 10 | 5 | HEAAm | 10 | A | A |
| Example 6 | 6 | Compound 12 | 5 | HEAAm | 10 | B | A |
| Example 7 | 7 | Compound 17 | 5 | HEAAm | 10 | B | A |
| Example 8 | 8 | Compound 20 | 5 | HEAAm | 10 | A | A |
| Example 9 | 9 | Compound 26 | 5 | HEAAm | 10 | A | A |
| Example 10 | 10 | Compound 1 | 1 | HEAAm | 4 | B | B |
| Example 11 | 11 | Compound 1 | 30 | — | — | A | A |
| Example 12 | 12 | Compound 1 | 5 | DAAm | 10 | B | B |
| Comparative Example 1 | C1 | — | — | HEAAm | 15 | C | D |
| Comparative Example 2 | C2 | Comparative compound 1 | 5 | HEAAm | 10 | B | C |

HEAAm: Hydroxyethyl acrylamide
DAAm: Diacetone acrylamide
Note):
The "—" notation means that the compound is not included.

It is understood that the ink compositions of the present invention exhibited excellent curability. It is also understood that the formed images exhibited excellent blocking resistance. Further, in all of the Examples, the results of the evaluation of ink storage stability were classified as Grade A.

Further, evaluations were performed in the same manner as in the above evaluations, except that treatment liquids 2 to 4 were respectively used in place of the treatment liquid 1. As a result, even when the treatment liquids 2 to 4 was used; images having excellent curability and excellent blocking resistance were formed, similarly to when the treatment liquid 1 was used. Here, the treatment liquids 2 to 4 were prepared as described below.

Preparation of Treatment Liquid 2

The following materials were mixed, thereby producing a treatment liquid 2. When the pH (25° C.) of the treatment liquid 2 after adjusting the pH was measured with a pH meter WM-50EG (trade name) manufactured by TOA DKK CORPORATION, the pH was 4.0.

Composition of Treatment Liquid 2

| | |
|---|---|
| Polyethyleneimine (manufactured by Nippon Shokubai Co., Ltd., cationic polymer) | 13.0% |
| Ion exchange water | Added to be 100% in total |

Preparation of Treatment Liquid 3

The following materials were mixed, thereby producing a treatment liquid 3. When the pH (25° C.) of the treatment liquid 3 was measured with a pH meter WM-50EG (trade name) manufactured by TOA DKK CORPORATION, the pH was 4.0.

Composition of Treatment Liquid 3

| | |
|---|---|
| Magnesium nitrate (manufactured by Sigma-Aldrich Co., polyvalent metal salt) | 15% |
| Diethylene glycol monoethyl ether (manufactured by Tokyo Chemical Industry Co., Ltd.) | 4% |
| Surfactant A below (10% aqueous solution) | 1% |
| Ion exchange water | Added to be 100% in total |

Preparation of treatment liquid 4

The following materials were mixed, thereby producing a treatment liquid 4. When the pH (25° C.) of the treatment liquid 4 after adjusting the pH was measured with a pH meter WM-50EG (trade name) manufactured by TOA DKK CORPORATION, the pH was 5.0.

Composition of Treatment Liquid 4

| | |
|---|---|
| Poly(vinylimidazole) (cationic polymer) | 13.0% |
| GP-250 (trade name, manufactured by Sanyo Chemical Industries, Ltd., water-soluble organic solvent) | 10% |
| Surfactant A below (10% aqueous solution) | 0.2% |
| Ion exchange water | Added to be 100% in total |

Surfactant A:
$C_7H_{15}$—CH=CH—$C_7H_{14}$—C(=O)—N($CH_3$)—$CH_2CH_2$—$SO_3Na$

Furthermore, the evaluations were performed in the same manner as above, except that O.K. TOPKOTE PLUS (trade name, basis weight: 104.7 g/m$^2$) and U-LIGHT (trade name, basis weight: 104.7 g/m$^2$) were respectively used as a recording medium in place of TOKUBISHI ART (trade name, basis weight: 104.7 g/m$^2$). Even when O.K. TOPKOTE PLUS and U-LIGHT were used, images having excellent curability (curing sensitivity) and excellent blocking resistance were formed, similarly to when as in the case where the TOKUBISHI ART was used.

According to the present invention, an ink composition and an ink set having excellent curability (curing sensitivity), and in which an image formed thereby has excellent blocking resistance can be provided, and an image forming method using the same can be provided.

Embodiments of the present invention include, but are not limited to, the following.

<1> An ink composition comprising a polymerization initiator, water, and a modified polyallylamine or modified polyvinylamine having an ethylenically unsaturated double bond in a side chain thereof.

<2> The ink composition according to <1>, wherein the ethylenically unsaturated double bond comprises a structure represented by the following Formula (I-A):

Formula (I-A)

wherein, in Formula (I-A), $B^2$ represents an alkylene group having from 1 to 8 carbon atoms or a carbonyl group; $R^{21}$ represents a single bond or an arylene group having from 6 to 10 carbon atoms; $R^{22}$ represents a hydrogen atom or a methyl group; and * represents a bonding site.

<3> The ink composition according to <2>, wherein the modified polyallylamine or modified polyvinylamine having an ethylenically unsaturated double bond in a side chain thereof comprises a compound having a structure represented by the following Formula (I):

Formula (I)

wherein, in Formula (I), $A^1$ represents Formula (I-A); $X^1$ represents a hydrogen atom or the following Formula (I-X); and $n^1$ represents 0 or 1:

Formula (I-X)

wherein, in Formula (I-X), $Y^{31}$ represents an alkylene group having from 1 to 8 carbon atoms or an arylene group having from 6 to 10 carbon atoms; $Z^{31}$ represents a hydrogen atom or —COOM$^{31}$; M$^{31}$ represents an alkaline metal atom; and * represents a bonding site.

<4> The ink composition according to <3>, wherein the compound having the structure represented by Formula (I) further has a structure represented by the following Formula (I');

Formula (I')

wherein, in Formula (I'), $X^2$ represents the following Formula (I'-X); and $n^2$ represents 0 or 1:

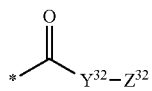

Formula (I'-X)

wherein, in Formula (I'-X), $Y^{32}$ represents an alkylene group having from 1 to 8 carbon atoms or an arylene group having from 6 to 10 carbon atoms; $Z^{32}$ represents a hydrogen atom or —COOM$^{32}$; M$^{32}$ represents an alkaline metal atom; and * represents a bonding site.

<5> The ink composition according to any one of <2> to <4>, wherein Formula (I-A) is the following Formula (I-A-1) or (I-A-2):

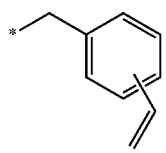

Formula (I-A-1)

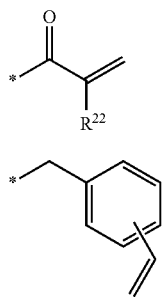

Formula (I-A-2)

wherein, in Formula (I-A-1), $R^{22}$ represents a hydrogen atom or a methyl group; and * represents a bonding site.

<6> The ink composition according to <1>, wherein the modified polyallylamine or modified polyvinylamine having an ethylenically unsaturated double bond in a side chain thereof has a weight average molecular weight of from 1,000 to 50,000.

<7> The ink composition according to any one of <1> to <6> further comprising a color material.

<8> The ink composition according to any one of <1> to <7>, wherein the polymerization initiator comprises a photopolymerization initiator.

<9> The ink composition according to any one of <1> to <8> further comprising a (meth)acrylamide compound or a (meth)acrylate compound.

<10> An ink set comprising the ink composition according to any one of <1> to <9> and a treatment liquid that is capable of forming an aggregate when contacting the ink composition.

<11> The ink set according to <10>, wherein the treatment liquid comprises at least one selected from the group consisting of an acidic compound, a polyvalent metal salt, and a cationic polymer.

<12> An image forming method comprising:
applying the treatment liquid included in the ink set according to <10> or <11> onto a recording medium, and
applying the ink composition included in the ink set onto the recording medium to form an image.

<13> The image forming method according to <12>, wherein the recording medium comprises a coated paper.

<14> The image forming method according to <12> or <13>, wherein the applying of the ink composition comprises applying the ink composition onto the recording medium on which the treatment liquid has been applied in the applying of the treatment liquid.

<15> The image forming method according to any one of <12> to <14>, wherein the applying of the ink composition is performed by an ink-jet method.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising a polymerization initiator, water, and a modified polyallylamine or modified polyvinylamine having an ethylenically unsaturated double bond in a side chain thereof, wherein the ethylenically unsaturated double bond comprises a structure represented by the following Formula (I-A):

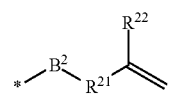

Formula (I-A)

wherein, in Formula (I-A), $B^2$ represents an alkylene group having from 1 to 8 carbon atoms or a carbonyl group; $R^{21}$ represents a single bond or an arylene group having from 6 to 10 carbon atoms; $R^{22}$ represents a hydrogen atom or a methyl group; and * represents a bonding site;

wherein the modified polyallylamine or modified polyvinylamine having an ethylenically unsaturated double bond in a side chain thereof comprises a compound having a structure represented by the following Formula (I):

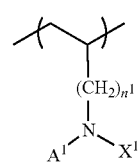

Formula (I)

wherein, in Formula (I), $A^1$ represents Formula (I-A); $X^1$ represents a hydrogen atom or the following Formula (I-X); and $n^1$ represents 0 or 1:

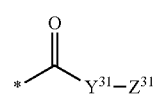

Formula (I-X)

wherein, in Formula (I-X), $Y^{31}$ represents an alkylene group having from 1 to 8 carbon atoms or an arylene group having from 6 to 10 carbon atoms; $Z^{31}$ represents a hydrogen atom or —COOM$^{31}$; M$^{31}$ represents an alkaline metal atom; and * represents a bonding site; and wherein the compound comprising the structure represented by Formula (I) further comprises a structure represented by the following Formula (I'):

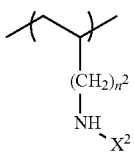

Formula (I')

wherein, in Formula (I'), $X^2$ represents the following Formula (I'-X); and $n^2$ represents 0 or 1:

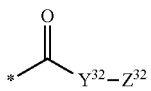

Formula (I'-X)

wherein, in Formula (I'-X), $Y^{32}$ represents an alkylene group having from 1 to 8 carbon atoms or an arylene group having from 6 to 10 carbon atoms; $Z^{32}$ represents a hydrogen atom or —COOM$^{32}$; M$^{32}$ represents an alkaline metal atom; and * represents a bonding site.

2. The ink composition according to claim 1, wherein Formula (I-A) is the following Formula (I-A-1) or (I-A-2):

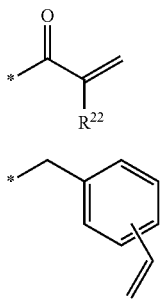

Formula (I-A-1)

Formula (I-A-2)

wherein, in Formula (I-A-1), $R^{22}$ represents a hydrogen atom or a methyl group; and * represents a bonding site.

3. The ink composition according to claim 1, wherein the modified polyallylamine or modified polyvinylamine having an ethylenically unsaturated double bond in a side chain thereof has a weight average molecular weight of from 1,000 to 50,000.

4. The ink composition according to claim 1 further comprising a color material.

5. The ink composition according to claim 1, wherein the polymerization initiator comprises a photopolymerization initiator.

6. The ink composition according to claim 1 further comprising a (meth)acrylamide compound or a (meth)acrylate compound.

7. An ink set comprising the ink composition according to claim 1 and a treatment liquid that is capable of forming an aggregate when contacting the ink composition.

8. The ink set according to claim 7, wherein the treatment liquid comprises at least one selected from the group consisting of an acidic compound, a polyvalent metal salt, and a cationic polymer.

9. An image forming method comprising: applying the treatment liquid included in the ink set according to claim 7 onto a recording medium, and applying the ink composition included in the ink set onto the recording medium to form an image.

10. The image forming method according to claim 9, wherein the recording medium comprises a coated paper.

11. The image forming method according to claim 9, wherein the applying of the ink composition comprises applying the ink composition onto the recording medium on which the treatment liquid has been applied in the applying of the treatment liquid.

12. The image forming method according to claim 9, wherein the applying of the ink composition is performed by an ink jet method.

* * * * *